(12) United States Patent
Mizusaki et al.

(10) Patent No.: US 10,996,532 B2
(45) Date of Patent: May 4, 2021

(54) LIQUID CRYSTAL DIFFRACTION GRATING, LIQUID CRYSTAL COMPOSITION, METHOD FOR PRODUCING LIQUID CRYSTAL DIFFRACTION GRATING, AND WIRE GRID POLARIZER

(71) Applicant: SHARP KABUSHIKI KAISHA, Sakai (JP)

(72) Inventors: Masanobu Mizusaki, Sakai (JP); Kiyoshi Minoura, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 137 days.

(21) Appl. No.: 16/138,829

(22) Filed: Sep. 21, 2018

(65) Prior Publication Data
US 2019/0086698 A1    Mar. 21, 2019

(30) Foreign Application Priority Data
Sep. 21, 2017    (JP) .............. JP2017-181432

(51) Int. Cl.
*G02F 1/137*    (2006.01)
*G02F 1/1339*    (2006.01)
(Continued)

(52) U.S. Cl.
CPC .............. *G02F 1/137* (2013.01); *C09K 19/56* (2013.01); *G02B 5/3058* (2013.01); *G02F 1/1339* (2013.01); *G02F 1/133528* (2013.01); *G02F 1/133788* (2013.01); *G02F 1/292* (2013.01); *G02F 2001/133548* (2013.01);
(Continued)

(58) Field of Classification Search
CPC . C09K 19/56; G02B 5/3058; G02F 1/133528; G02F 1/133788; G02F 1/1339; G02F 1/137; G02F 1/292; G02F 2001/133548; G02F 2001/133738; G02F 2201/305
See application file for complete search history.

(56) References Cited

U.S. PATENT DOCUMENTS

2008/0278675 A1    11/2008    Escuti et al.
2009/0002580 A1*    1/2009    Matsushima ....... G02F 1/13363
                                                       349/12

(Continued)

FOREIGN PATENT DOCUMENTS

JP    2008-532085 A    8/2008

*Primary Examiner* — Sophie Hon
(74) *Attorney, Agent, or Firm* — ScienBiziP, P.C.

(57) ABSTRACT

The liquid crystal diffraction grating includes: paired substrates each including an electrode; a liquid crystal layer being held between the substrates; a sealant; and an alignment-controlling layer being disposed in a region surrounded by the sealant in a plan view and being in contact with the liquid crystal layer between the liquid crystal layer and each of the substrates, the alignment-controlling layer being configured to align liquid crystal molecules in a direction parallel to the substrates and containing a polymer of at least one monomer, the orientation of the liquid crystal molecules periodically rotating in at least one direction in a plan view of the liquid crystal layer in a state where the liquid crystal molecules are aligned in the direction parallel to the substrates.

10 Claims, 16 Drawing Sheets

(51) Int. Cl.
    *G02F 1/1337*   (2006.01)
    *C09K 19/56*    (2006.01)
    *G02B 5/30*     (2006.01)
    *G02F 1/1335*   (2006.01)
    *G02F 1/29*     (2006.01)

(52) U.S. Cl.
    CPC ............ *G02F 2001/133738* (2013.01); *G02F 2201/305* (2013.01)

(56)                References Cited

U.S. PATENT DOCUMENTS

| | | | |
|---|---|---|---|
| 2009/0059134 A1* | 3/2009 | Ishikawa | G02F 1/134363 349/96 |
| 2010/0110363 A1 | 5/2010 | Escuti et al. | |
| 2011/0242461 A1 | 10/2011 | Escuti et al. | |
| 2012/0086903 A1 | 4/2012 | Escuti et al. | |
| 2013/0335683 A1 | 12/2013 | Escuti et al. | |
| 2013/0336583 A1 | 12/2013 | Ernst et al. | |
| 2014/0213137 A1* | 7/2014 | Miyake | C09K 19/3003 445/25 |
| 2015/0277169 A1* | 10/2015 | Usukura | G02F 1/133788 359/9 |
| 2015/0293410 A1* | 10/2015 | Noma | G02F 1/133711 349/128 |

* cited by examiner

Incident light

Incident light

LIQUID CRYSTAL DIFFRACTION GRATING, LIQUID CRYSTAL COMPOSITION, METHOD FOR PRODUCING LIQUID CRYSTAL DIFFRACTION GRATING, AND WIRE GRID POLARIZER

CROSS-REFERENCE TO RELATED APPLICATIONS

The present application claims priority under 35 U.S.C. § 119 to Japanese Patent Application No. 2017-181432 filed on Sep. 21, 2017, the contents of which are incorporated herein by reference in their entirety.

BACKGROUND OF THE INVENTION

Field of the Invention

The present invention relates to liquid crystal diffraction gratings, liquid crystal compositions, methods for producing a liquid crystal diffraction grating, and wire grid polarizers. The present invention specifically relates to a liquid crystal diffraction grating, a liquid crystal composition, a method for producing a liquid crystal diffraction grating, and a wire grid polarizer which are suitable for an optical device capable of switching the transmission modes for near-infrared and infrared rays.

Description of Related Art

A liquid crystal diffraction grating is a diffraction grating utilizing a liquid crystal material to modulate polarization of light travelling inside, and is an optical device capable of dividing incident light into diffracted rays in multiple diffraction orders.

JP 2008-532085 T, for example, discloses a diffraction grating utilizing liquid crystal, which is a polarization grating comprising a polarization sensitive photo-alignment layer and a liquid crystal composition arranged on said alignment layer, wherein an anisotropic alignment pattern corresponding to a polarization hologram is arranged in said photo-alignment layer and said liquid crystal composition is aligned by said alignment pattern.

There will be future demand for development of (small) optical devices switchable between the opaque state and the transparent state to light, especially near-infrared light and infrared light. Such optical devices may be used for near-infrared cameras and infrared LEDs, for example. For these uses, switching devices with an especially high response speed will be required.

One technique switchable between the opaque state and the transparent state to near-infrared and infrared rays is polymer dispersed liquid crystal (PDLC). PDLC, however, has a low response speed and the use temperature range thereof is unfortunately narrow. The narrow use temperature range can be due to the polymer matrix restricting the mobility of liquid crystal molecules at low temperatures. At high temperatures near the glass transition temperature of the polymer, the fluidity of the polymer matrix itself is high, so that the flowing polymer matrix exhibits a low alignment-controlling force on the liquid crystal molecules, resulting in a lower response speed than that of a liquid crystal element containing no polymer matrix. The polymer matrix in PDLC means a polymeric structure composed of polymer networks and formed in the liquid crystal layer.

JP 2008-532085 T discloses, in Example 3, a switchable polarization grating, which is produced through a complicated process. In other words, two substrates are coated with a photo-alignment film, and they are arranged to form a closed cell structure with the alignment films facing each other. The cell is filled with cyclohexane and then exposed to right hand circularly polarized beams and left hand circularly polarized beams which are superimposed on each other. The cyclohexane is evaporated from the cell, and the cell is subsequently filled with a liquid crystal composition. The complicated process is employed presumably because if the substrates are bonded to each other after exposure of the substrates to light, the anisotropic alignment patterns of the substrates will be different. Also, if the cell is exposed to light after being filled with the liquid crystal composition, the liquid crystal composition will absorb light and scatter light, and the sides of the substrates opposite to the irradiated sides will not be irradiated with polarized light.

BRIEF SUMMARY OF THE INVENTION

The present invention was made in view of the current state of the art, and aims to provide a liquid crystal diffraction grating having a high response speed and producible by a simple process, and a liquid crystal composition, a method for producing a liquid crystal diffraction grating, and a wire grid polarizer which are suitable for production of the liquid crystal diffraction grating.

One aspect of the present invention may be a liquid crystal diffraction grating including: paired substrates each including an electrode; a liquid crystal layer being held between the substrates and containing a liquid crystal material; a sealant disposed to surround the liquid crystal layer in a plan view; and an alignment-controlling layer being disposed in a region surrounded by the sealant in a plan view and being in contact with the liquid crystal layer between the liquid crystal layer and each of or one of the substrates, the alignment-controlling layer being configured to align liquid crystal molecules in the liquid crystal material in a direction parallel to the substrates and containing a polymer of at least one monomer, the orientation of the liquid crystal molecules periodically rotating in at least one direction in a plan view of the liquid crystal layer in a horizontal alignment state where the liquid crystal molecules are aligned in the direction parallel to the substrates, the liquid crystal diffraction grating being switchable between a diffraction state and a transparent state upon application of voltage to the electrodes of the substrates.

Another aspect of the present invention may be a liquid crystal composition containing: a liquid crystal material; at least one selected from a monomer containing a chalcone group and a monomer containing an azobenzene group; and a monomer containing a biphenyl group and an alkyl group.

Yet another aspect of the present invention may be a liquid crystal composition containing: a liquid crystal material; at least one selected from a monomer containing a chalcone group and a monomer containing an azobenzene group; and an additive containing a hydroxy group, a biphenyl group, and an alkyl group.

Yet another aspect of the present invention may be a method for producing a liquid crystal diffraction grating switchable between a diffraction state and a transparent state upon application of voltage to paired electrodes disposed on paired substrates between which a liquid crystal layer is held, the method including: forming a liquid crystal layer by sealing a liquid crystal composition containing a liquid crystal material and at least one monomer between the substrates which are bonded by a sealant; and forming an alignment-controlling layer between the liquid crystal layer and each of or one of the substrates by irradiating the liquid crystal layer with ultraviolet rays and thereby polymerizing the at last one monomer, the alignment-controlling layer being configured to align liquid crystal molecules in the liquid crystal material in a direction parallel to the substrates, the orientation of the liquid crystal molecules periodically rotating in at least one direction in a plan view of the liquid crystal layer in a horizontal alignment state where the liquid crystal molecules are aligned in the direction parallel to the substrates.

Yet another aspect of the present invention may be a wire grid polarizer including linear wires, the orientation of the wires periodically rotates in at least one direction.

The liquid crystal diffraction grating, the liquid crystal composition, the method for producing a liquid crystal diffraction grating, and a wire grid polarizer of the present invention allow production of a liquid crystal diffraction grating having a high response speed by a simple process.

BRIEF DESCRIPTION OF THE DRAWINGS

FIG. 9A shows the state before polymerization of a monomer and FIG. 9B shows the state after the polymerization of the monomer.

FIG. 14A shows a diffraction state of the liquid crystal diffraction grating and FIG. 14B shows a transparent state of the liquid crystal diffraction grating.

DETAILED DESCRIPTION OF THE INVENTION

Hereinafter, embodiments of the present invention are described. The embodiments, however, are not intended to limit the scope of the present invention. The present invention may appropriately be modified within the spirit of the present invention.

Embodiment 1

Liquid Crystal Diffraction Grating

A liquid crystal diffraction grating of Embodiment 1 is described. The liquid crystal diffraction grating of the present embodiment is a diffraction grating utilizing a liquid crystal material to modulate polarization of light travelling inside, and is an optical device capable of dividing incident light into diffracted rays in multiple diffraction orders.

Figure 1:
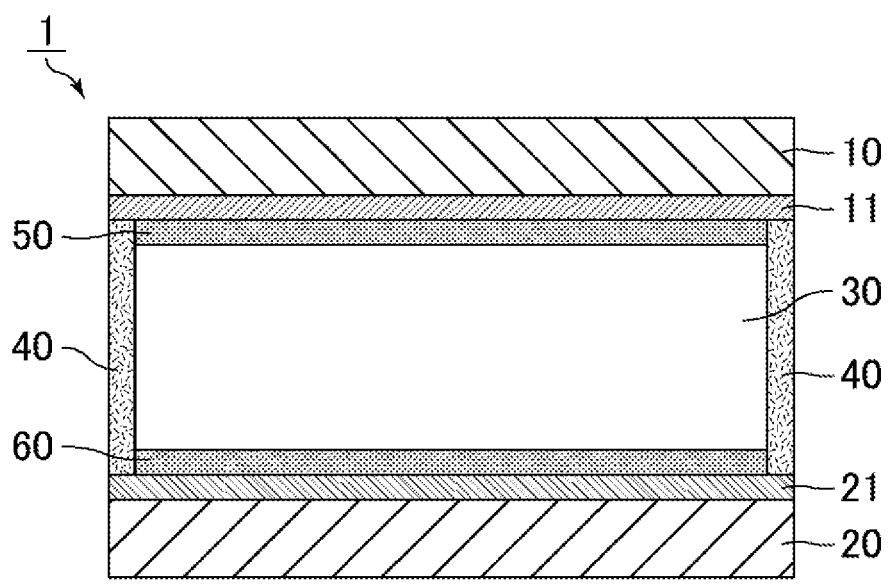
FIG. 1 is a schematic cross-sectional view of a liquid crystal diffraction grating of Embodiment 1.

FIG. 1 is a schematic cross-sectional view of a liquid crystal diffraction grating of Embodiment 1. As shown in FIG. 1, a liquid crystal diffraction grating 1 of the present embodiment includes a liquid crystal layer 30, paired substrates 10 and 20 between which the liquid crystal layer 30 is held, a sealant 40 bonding the substrates 10 and 20 to each other, and paired alignment-controlling layers 50 and 60 disposed between the liquid crystal layer 30 and the substrates 10 and 20, respectively.

The substrates 10 and 20 are transparent substrates formed of a material such as glass or plastic, and have electrodes 11 and 21, respectively, on their surfaces adjacent to the liquid crystal layer 30.

The electrodes 11 and 21 are transparent electrodes formed of a transparent conductive film material such as indium tin oxide (ITO) and are connected to a voltage application device (not shown). The electrodes 11 and 21 are disposed on substantially the entire surfaces adjacent to the liquid crystal layer 30 of the substrates 10 and 20, respectively. When voltage is applied to the electrodes 11 and 21 (hereinafter, this state is also referred to as simply "with voltage applied"), an electric field (vertical electric field) is generated in the thickness direction in the liquid crystal layer 30.

The liquid crystal diffraction grating 1 of the present embodiment is switchable between a diffraction state and a transparent state upon application of voltage to the electrodes 11 and 21. In other words, the liquid crystal diffraction grating 1 switches between a state of functioning as a liquid crystal diffraction grating and a state of functioning as a transparent medium for light passing therethrough, when no voltage is applied to the electrodes 11 and 21 (hereinafter, this state is also referred to simply as "with no voltage applied") and with voltage applied. The liquid crystal diffraction grating 1 usually functions as a liquid crystal diffraction grating for light passing therethrough with no voltage applied, while functioning as a transparent medium for light passing therethrough with voltage applied.

The "transparent state" as used herein means a state where incident light passed through a liquid crystal diffraction grating travels straight. The "diffraction state" means a state where incident light passed through a liquid crystal diffraction grating travels in a different direction (diffracted).

The level of voltage applied to the electrodes 11 and 21 is not limited and may appropriately be determined. The maximum level of voltage is preferably 3 to 50 V, more preferably 4 to 10 V, still more preferably 5 to 8 V.

Figure 2:
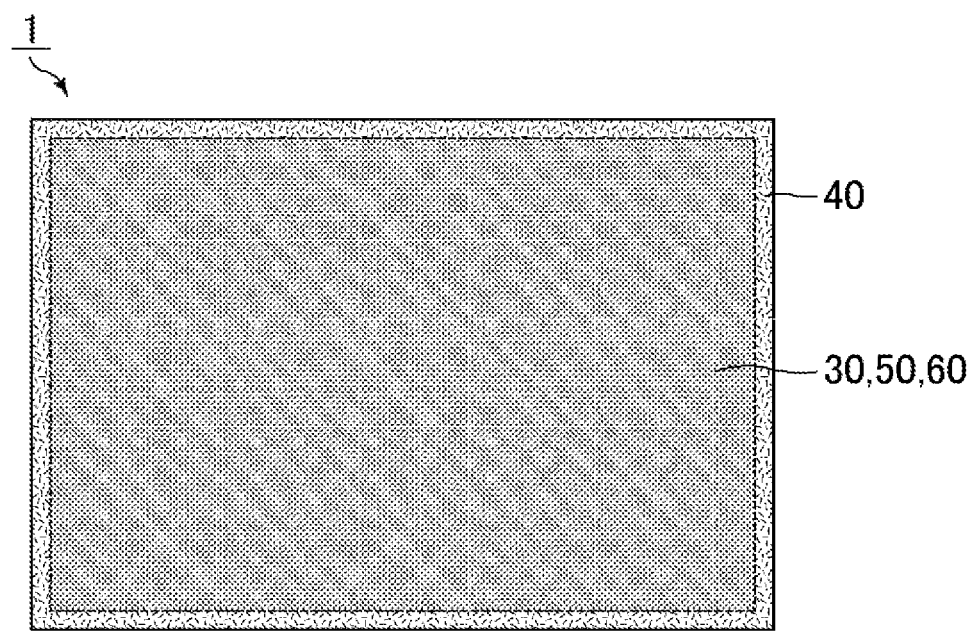
FIG. 2 is a schematic plan view of the liquid crystal diffraction grating of Embodiment 1.

FIG. 2 is a schematic plan view of the liquid crystal diffraction grating of Embodiment 1. The sealant 40 is disposed, as shown in FIG. 2, to surround the liquid crystal layer 30 in a plan view. The sealant 40 may be curable using light (e.g., ultraviolet rays) or heat, or may be curable using both light and heat. Examples of the sealant 40 include those containing an epoxy resin or (meth)acrylic resin. The sealant 40 may contain an inorganic filler, an organic filler, or a curing agent, for example. The sealant 40 can be, for example, Photolec available from Sekisui Chemical Co., Ltd.

The liquid crystal layer 30 contains a liquid crystal material containing at least one type of liquid crystal molecules. The liquid crystal material is thermotropic liquid crystal, preferably a liquid crystal material in a nematic phase (nematic liquid crystal). The liquid crystal material is preferably one which undergoes a phase transition in which the material transforms from the nematic phase to the isotropic phase when the temperature is increased to a critical temperature (nematic-isotropic transition temperature ($T_{NI}$)) or higher. The liquid crystal layer 30 is preferably in a nematic phase in the usage environment of the liquid crystal diffraction grating (for example, −40° C. to 90° C.). The nematic-isotropic transition temperature of the liquid crystal material may be any temperature and may be, for example, 70° C. to 110° C. The $T_{NI}$ mentioned above is $T_{NI}$ of the liquid crystal material before a monomer described below is added.

The anisotropy of dielectric constant (Δε) represented by the following formula of the liquid crystal material and the liquid crystal molecules is positive. In other words, the liquid crystal material and the liquid crystal molecules have positive anisotropy of dielectric constant. For example, those having Δε of 1 to 20 can be used. Liquid crystal materials and liquid crystal molecules having positive anisotropy of dielectric constant have characteristics such as a high $T_{NI}$ and high response speed (low rotational viscosity).

Δε=(dielectric constant in major axis direction)−(dielectric constant in minor axis direction)

The retardation of the liquid crystal layer 30 may be any value and appropriately determined to be suited to use of the liquid crystal diffraction grating 1. The retardation is usually 200 nm or more and 650 nm or less, preferably 270 nm or more and 550 nm or less. With a retardation of 270 nm or more and 550 nm or less, the liquid crystal diffraction grating 1 can be used both as a display and as a switch for a (near) infrared sensor.

The alignment-controlling layers 50 and 60 are disposed such that they are in contact with the liquid crystal layer 30, and they align liquid crystal molecules in a liquid crystal material in the direction parallel to the substrates 10 and 20. With no voltage applied, the alignment of the liquid crystal material is controlled by the alignment-controlling layers 50 and 60.

Aligning liquid crystal molecules in the liquid crystal material in the direction parallel to the substrates 10 and 20 means that the pre-tilt angle of the liquid crystal material is 0° or greater and 10° or smaller. With a pre-tilt angle of 0° or greater and 10° or smaller, the diffraction state can be more effectively achieved and liquid crystal molecules having the pre-tilt angle respond in a more effective manner upon voltage application. This leads to more effective switching between the diffraction state and the transparent state. The pre-tilt angle is an angle (tilt angle) between the main surface of the substrate 10 or 20 and the major axis of the liquid crystal material (liquid crystal molecule) with no voltage applied. The main surface of each of the substrates 10 and 20 is defined as 0°, and the direction normal to the main surface of each of the substrates 10 and 20 is defined as 90°.

For a more stable response speed of the liquid crystal molecules upon application of voltage to the liquid crystal diffraction grating 1 (electrodes 11 and 21), the pre-tilt angle is preferably greater than 0°. The pre-tilt angle is preferably 0.5° or greater and 10° or smaller, more preferably 1° or greater and 5° or smaller. If the pre-tilt angle is smaller than 0.5°, liquid crystal molecules are less likely to respond upon application of voltage, causing a failure in switching between the diffraction state and the transparent state upon voltage application. If the pre-tilt angle is greater than 10°, the tilt angle may not be controlled stably and thus pre-tilt angles may be significantly different in some regions in a plane. Different pre-tilt angles in some regions in a plane mean different transmittances in the regions with voltage applied, which may cause a failure in switching between the diffraction state and the transparent state.

Figure 3:
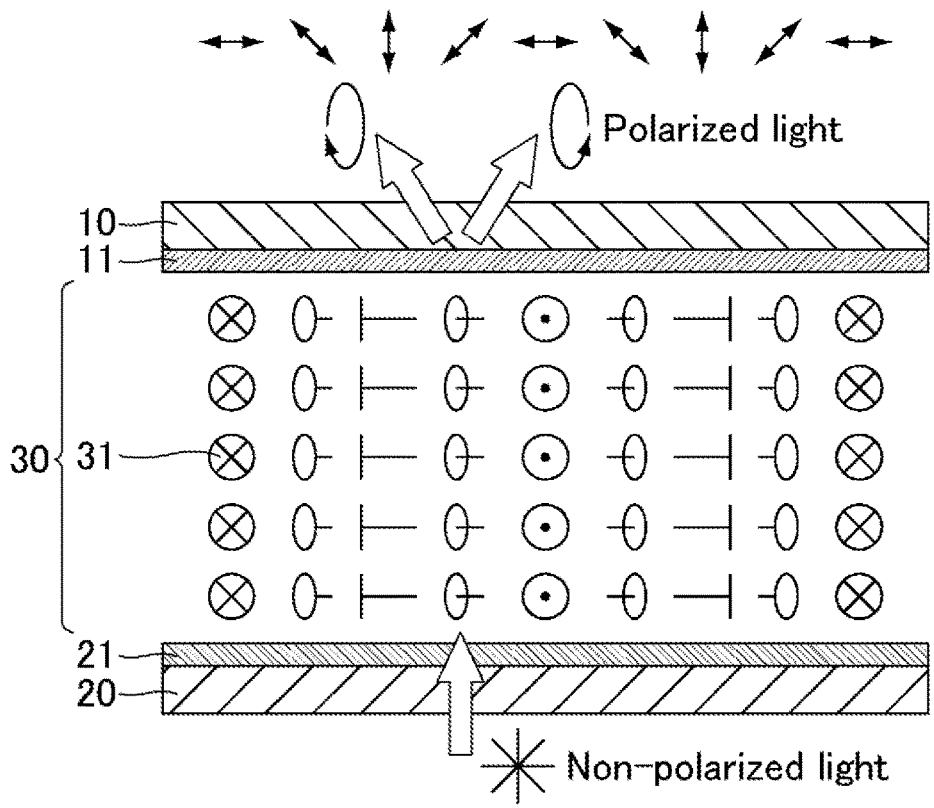
FIG. 3 is a schematic cross-sectional view of the liquid crystal diffraction grating of Embodiment 1 whose liquid crystal material has no pre-tilt angle (pre-tilt angle=0°) with no voltage applied.
Figure 4:
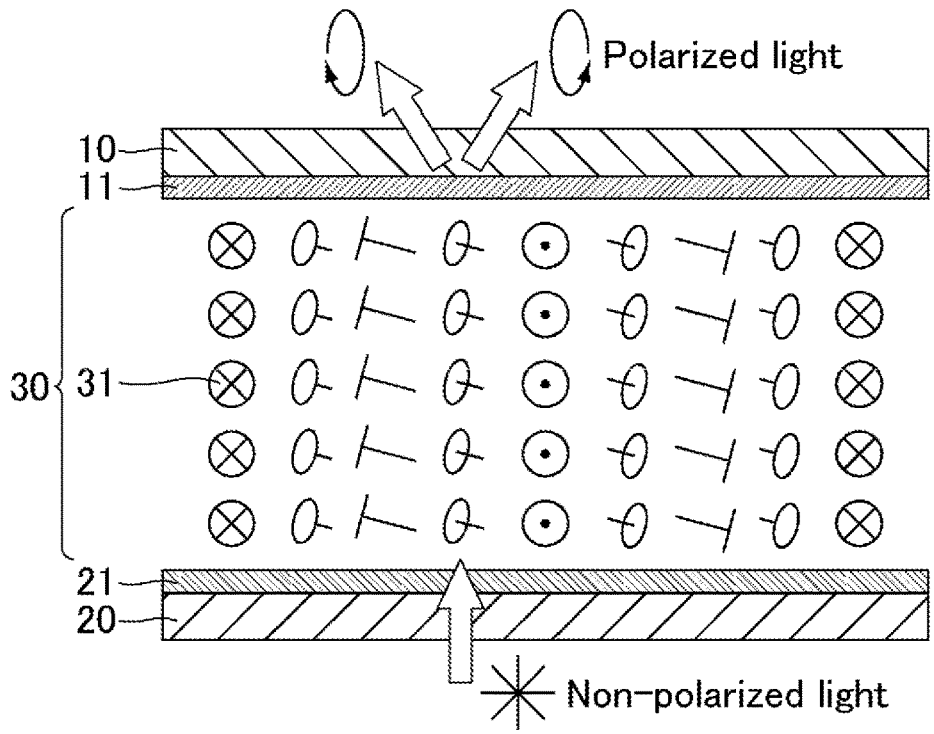
FIG. 4 is a schematic cross-sectional view of the liquid crystal diffraction grating of Embodiment 1 whose liquid crystal material has a pre-tilt angle (pre-tilt angle>0°) with no voltage applied.
Figure 5:
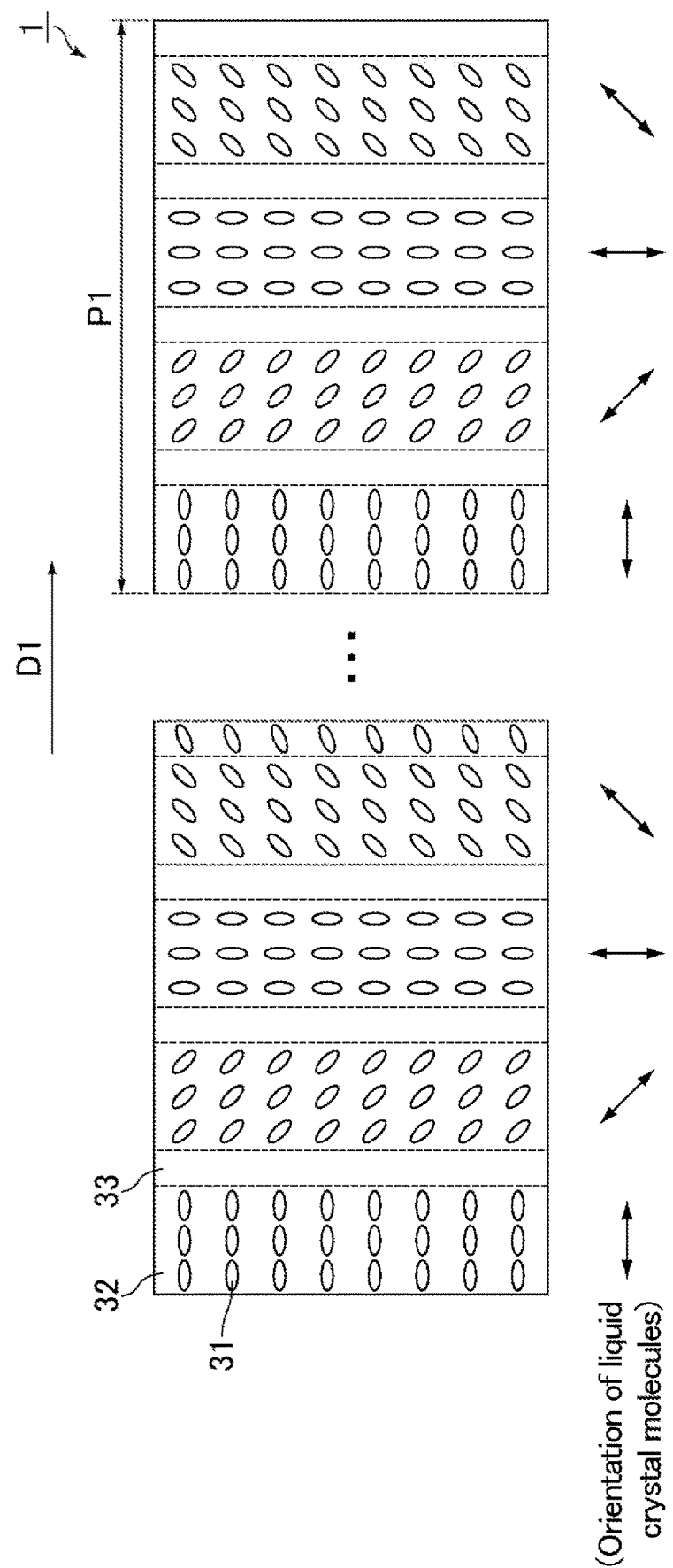
FIG. 5 is a schematic plan view of the liquid crystal diffraction grating of Embodiment 1 with no voltage applied.

FIG. 3 is a schematic cross-sectional view of the liquid crystal diffraction grating of Embodiment 1 whose liquid crystal material has no pre-tilt angle (pre-tilt angle=0°) with no voltage applied. FIG. 4 is a schematic cross-sectional view of the liquid crystal diffraction grating of Embodiment 1 whose liquid crystal material has a pre-tilt angle (pre-tilt angle>0°) with no voltage applied. FIG. 5 is a schematic plan view of the liquid crystal diffraction grating of Embodiment 1 with no voltage applied. As shown in FIGS. 3 to 5, in a plan view of the liquid crystal layer 30 in the horizontal alignment state where the liquid crystal molecules 31 are aligned in the direction parallel to the substrates 10 and 20, the orientation of the liquid crystal molecules 31 periodically rotates in a direction D1. This structure divides (diffuses) unpolarized light incident on the liquid crystal diffraction grating 1 into polarized light rays in multiple diffraction orders (diffracted light) when the light is passed through the liquid crystal layer 30, so that the diffraction state is achieved. The liquid crystal diffraction grating 1 in the diffraction state is opaque to light that is incident thereon, appears opaque white, and has a high haze. As shown in the upper part of FIG. 3, polarized light passed through the liquid crystal diffraction grating 1 is linearly polarized light whose polarization direction rotates at a low pitch. Such light, when observed from the emission side, includes linearly polarized light rays at different angles (polarization directions) overlapping each other and thus appear like elliptically or circularly polarized light. The directions of the elliptically or circularly polarized light rays are different (clockwise and counterclockwise) because the polarization direction of the linearly polarized light changes in the direction D1.

As shown in FIGS. 3 and 4, the horizontal alignment state is a state with no voltage applied, and the periodically rotating orientation of the liquid crystal molecules 31 is achieved by the alignment-controlling force provided by the alignment-controlling layers 50 and 60.

Figure 6:
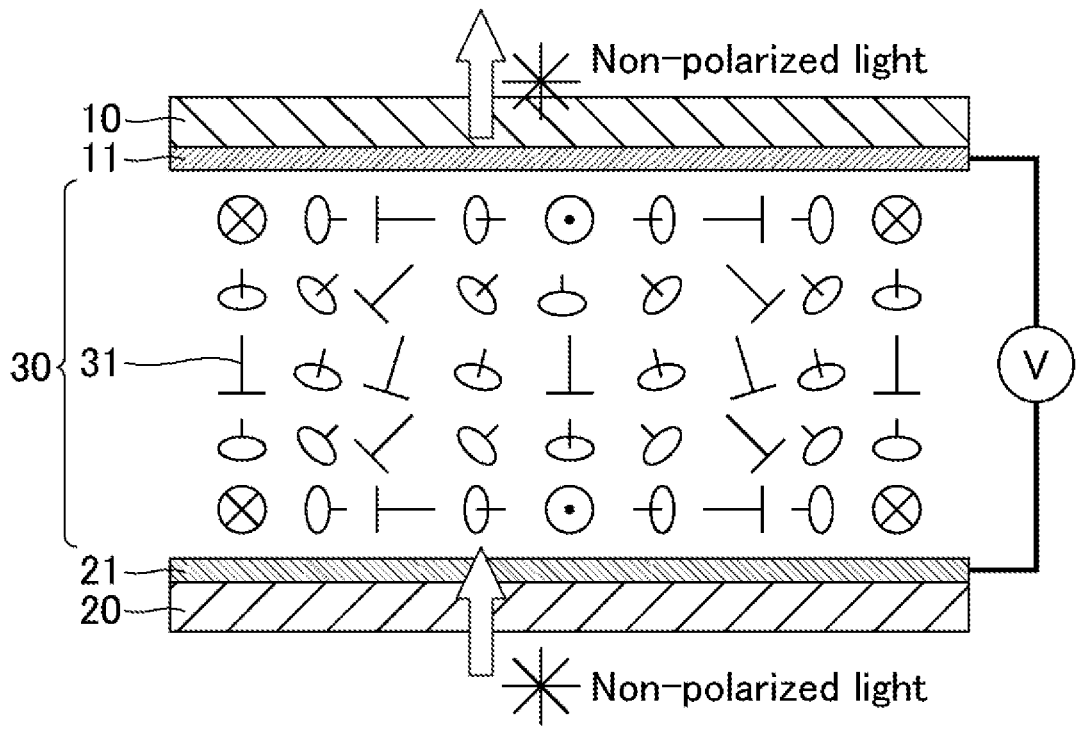
FIG. 6 is a schematic cross-sectional view of the liquid crystal diffraction grating of Embodiment 1 with voltage applied.

FIG. 6 is a schematic cross-sectional view of the liquid crystal diffraction grating of Embodiment 1 with voltage applied. As shown in FIG. 6, with voltage applied, an electric field (vertical electric field) is generated in the thickness direction in the liquid crystal layer 30. Also, the liquid crystal molecules 31, having positive anisotropy of dielectric constant, rise from the main surfaces of the substrates 10 and 20, which increases the angle (tilt angle) between the major axis of each liquid crystal molecule 31 and the main surface of the substrate 10 or 20. Unpolarized light incident on the liquid crystal diffraction grating 1 in this state travels straight through the liquid crystal layer 30. The liquid crystal diffraction grating 1 is therefore in the transparent state.

As described above, the liquid crystal diffraction grating 1 is theoretically switchable between the on and off states upon voltage application, meaning that it can switch between the opaque state and the transparent state to light passing therethrough. Since the liquid crystal layer 30 has no polymer matrix, the liquid crystal diffraction grating 1 has a higher response speed than a device utilizing PDLC.

In a plan view of the liquid crystal layer 30 in the horizontal alignment state, the orientation of the liquid crystal molecules 31 preferably half rotates in the direction D1 at a pitch P1 of 5 µm or more and 50 µm or less. If the pitch P1 is less than 5 µm, a wire grid polarizer may not be produced. If the pitch P1 is more than 50 µm, the diffraction may be insufficient and the haze may decrease. The upper limit of the pitch P1 is preferably 30 µm or less. If the pitch P1 is more than 30 µm, the superiority of the liquid crystal diffraction grating 1 in terms of the haze and contrast ratio to a device utilizing light scattering, such as PDLC, may be lost. The pitch P1 is more preferably 8 µm or more and 16 µm or less.

As shown in FIG. 5, in a plan view in the horizontal alignment state, the liquid crystal layer 30 includes domains 32 arranged in the direction D1. In each domain 32, the liquid crystal molecules 31 are oriented to the same direction (including substantially the same direction). In other words, a region in which the liquid crystal molecules 31 are oriented to the same direction in the horizontal alignment state corresponds to a domain 32. The orientation of the liquid crystal molecules 31 in each domain 32 rotates by a predetermined angle in the neighboring domain 32 in the arrangement direction of the domains 32. In other words, the orientation of the liquid crystal molecules 31 in each domain 32 rotates by a predetermined angle in the neighboring domain 32 when the domains 32 are observed in the direction D1. With this structure, the alignment-controlling layers 50 and 60 can be more easily formed using a wire grid polarizer as described later, and thus the periodically rotating orientation of the liquid crystal molecules 31 can be more easily achieved.

The predetermined angle is not particularly limited and may appropriately be determined. The twist angle of polarized light passed through the liquid crystal diffraction grating 1 is preferably uniform, for uniform diffraction. For example, the angle is preferably not greatly deviated from 45°, the midpoint of a twist between 0° and 90°. From this viewpoint, the predetermined angle is preferably 40° to 50°, more preferably 44° to 46°, still more preferably 44.5° to 45.5°, particularly preferably substantially 45°.

As shown in FIG. 5, a boundary region 33 may be provided between two neighboring domains 32 in the direction D1. The alignment of the liquid crystal molecules 31 in the boundary regions 33 is not controlled, so that the liquid crystal molecules 31 in the boundary regions 33 are randomly aligned with no voltage applied.

The width of each domain 32 in the direction D1 is preferably wider than, more preferably twice or more, the width of each boundary region 33 in the direction D1. If the width of each boundary region 33 in the direction D1 is wider than the width of each domain 32 in the direction D1, the widths of regions without liquid crystal alignment control are wide, with which the liquid crystal diffraction grating 1 may not be able to suitably control the polarization.

For the switching described above, as shown in FIGS. 3 to 5, the orientation of the liquid crystal molecules 31 with no voltage applied is required to rotate at a constant pitch P1. One possible method is applying a photo-alignment film to the upper and lower substrates, and performing alignment treatment with the alignment azimuth changed at regular intervals. This method, however, causes slight misalignment of alignment azimuths between the upper and lower substrates when the substrates are bonded to each other, so that an ideal diffraction grating as shown in FIGS. 3 to 5 cannot be obtained. In order to avoid misalignment of alignment azimuths of the liquid crystal molecules 31 between the surfaces of the substrates 10 and 20, the present embodiment utilizes a technique that can control the alignment azimuths of liquid crystal directors (liquid crystal molecules 31) after the substrates 10 and 20 are bonded to each other.

Specifically, the alignment-controlling layers 50 and 60 are disposed in a region surrounded by the sealant 40 in a plan view as shown in FIG. 2, and contain a polymer of at least one monomer. Each of the alignment-controlling layers 50 and 60 is therefore a polymer layer containing a polymer that has a unit derived from the at least one monomer. Thereby, the alignment-controlling layers 50 and 60 can be formed after the substrates 10 and 20 are bonded to each other, by irradiating a liquid crystal material (liquid crystal composition) containing the at least one monomer with ultraviolet rays through a wire grid polarizer. This technique prevents misalignment of alignment azimuths of the liquid crystal molecules 31 on the surfaces of the substrates 10 and 20 and achieves the periodically rotating orientation of the liquid crystal molecules 31. This technique is simple as compared with the method described in Example 3 of JP 2008-532085 T, and thus allows production of the liquid crystal diffraction grating 1 by a simple process. The alignment-controlling layers 50 and 60 are usually formed in substantially the entire region surrounded by the sealant 40 in a plan view. The details of the formation of the alignment-controlling layers 50 and 60 are described later.

The at least one monomer and the polymer preferably contain at least one polarized light-absorbing functional group. The "polarized light-absorbing functional group" as used herein means a photo-functional group having an anisotropic light absorption behavior. The "photo-functional group" means a functional group that can undergo a photoreaction. A polarized light-absorbing functional group, having anisotropic light (preferably ultraviolet rays) absorption behavior, is alignable when irradiated with polarized light (preferably polarized ultraviolet rays, more preferably linearly polarized ultraviolet rays). Specifically, when irradiated with polarized light, a polarized light-absorbing functional group aligned at a specific azimuth corresponding to the polarization axis direction undergoes a photoreaction. This causes polymerization of the monomer containing the polarized light-absorbing functional group at the specific alignment azimuth, whereby a polymer is formed. This means that without formation of alignment films, controlling the polarization axis direction of the applied polarized light enables the alignment-controlling layers 50 and 60 derived from a monomer containing the polarized light-absorbing functional group to align the liquid crystal molecules 31 at a desired azimuth. In this manner, the polarized light-absorbing functional group absorbs polarized light (preferably polarized ultraviolet rays, more preferably linearly polarized ultraviolet rays) and thereby exerts the alignment-controlling force.

Whether or not the light absorption by the photo-functional group of the monomer is anisotropic can be tested by polarized absorption spectrum measurement. Specifically, first, a polarizer is set at each side of the measurement target (for example, film or solution). The light absorption spectrum is measured in both the crossed Nicols arrangement and the parallel Nicols arrangement of the polarizers. The absorbances at the same wavelength in the measured light absorption spectra are compared to determine whether or not the absorption is anisotropic. A difference in absorbance between the crossed Nicols arrangement and the parallel Nicols arrangement means that the target photo-functional group has an anisotropic behavior in absorbing light having the wavelength compared.

The monomer containing the polarized light-absorbing functional group may be a monofunctional monomer containing one polymerizable group, but is preferably a polyfunctional monomer containing multiple polymerizable groups, particularly preferably a bifunctional monomer containing two polymerizable groups.

Specific preferred examples of the polarized light-absorbing functional group include a chalcone group and an azobenzene group, for control of the alignment azimuth of the liquid crystal molecules 31 by aligning the liquid crystal molecules 31 in the direction parallel to the substrates 10 and 20. In other words, the at least one monomer contains as a photo-reactive monomer at least one selected from a monomer containing a chalcone group and a monomer containing an azobenzene group, and the chalcone group and the azobenzene group function as the photo-functional groups. With the chalcone group and/or the azobenzene group, the monomer containing the polarized light-absorbing functional group can absorb polarized light and cause an isomerization or dimerization reaction, effectively arranging (aligning) the liquid crystal molecules in a specific direction relative to the polarization direction, particularly in the perpendicular direction. For liquid crystal solubility, the chalcone group is more preferred than the azobenzene group. The "photo-reactive monomer" as used herein means a monomer containing a photo-functional group.

The chalcone group and the azobenzene group may each contain a substituent. The substituent may be of any type and is preferably, for example, a halogen, methyl, methoxy, ethyl, or ethoxy group. These may be used alone or in combination with each other. In other words, the substituent preferably contains at least one substituent selected from the group consisting of halogen, methyl, methoxy, ethyl, and ethoxy groups. The at least one monomer may contain at least one selected from a monomer containing a chalcone group with a substituent and a monomer containing an azobenzene group with a substituent and at least one selected from a monomer containing a chalcone group without a substituent and a monomer containing an azobenzene group without a substituent. The halogen group is preferably a fluoro group or a chloro group. In the case where the chalcone group contains a substituent, the substituent usually replaces at least one hydrogen atom in a ring structure (e.g., benzene ring) in the chalcone group. In the case where the azobenzene group contains a substituent, the substituent usually replaces at least one hydrogen atom in a ring structure (e.g., benzene ring) in the azobenzene group.

The chalcone group and the azobenzene group may each be a monovalent functional group, but are preferably a divalent chalcone group represented by the following formula (G-1) and a divalent azobenzene group represented by the following formula (G-2), respectively.

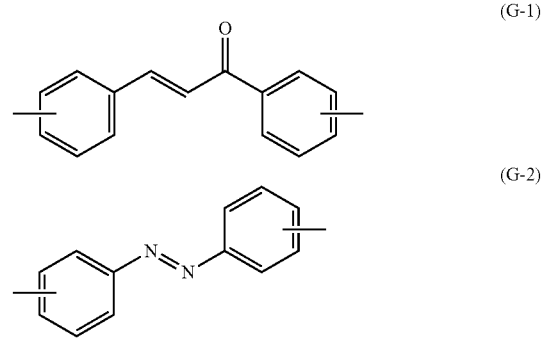

Examples of the photoreaction of the polarized light-absorbing functional group triggered by polarized light irradiation include dimerization (formation of dimers), isomerization, photo-Fries rearrangement, and decomposition. The chalcone group undergoes dimerization (formation of dimers), isomerization, or both dimerization and isomerization when irradiated with polarized ultraviolet rays (preferably linearly polarized ultraviolet rays). The azobenzene group undergoes isomerization when irradiated with polarized ultraviolet rays (preferably linearly polarized ultraviolet rays).

The monomer containing the chalcone group preferably contains at least one monomer represented by the following formula (A).

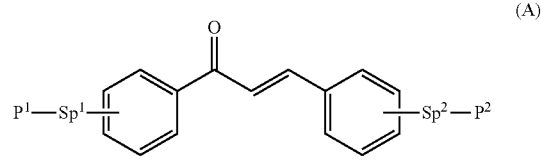

In the formula, $P^1$ and $P^2$ are the same as or different from each other, and are each an acryloyloxy, methacryloyloxy, acryloylamino, methacryloylamino, vinyl, or vinyloxy group; $Sp^1$ and $Sp^2$ are the same as or different from each other, and are each a C1-C6 linear, branched, or cyclic alkylene or alkyleneoxy group, or a direct bond; and at least one hydrogen atom of each phenylene group may be replaced.

In the formula (A), at least one hydrogen atom of each phenylene group may be replaced by a halogen atom (preferably a fluorine or chlorine atom), or a methyl, methoxy, ethyl, or ethoxy group.

Specific preferred examples of the monomer represented by the formula (A) include monomers represented by the following formula (A-1) or (A-2). The monomers may be used alone or in combination with each other. An alkyl group introduced between at least one of the polymerizable groups and the chalcone group as in these monomers increases the flexibility of the molecular structure, thereby can increasing the level of alignment control triggered by polarized ultraviolet irradiation.

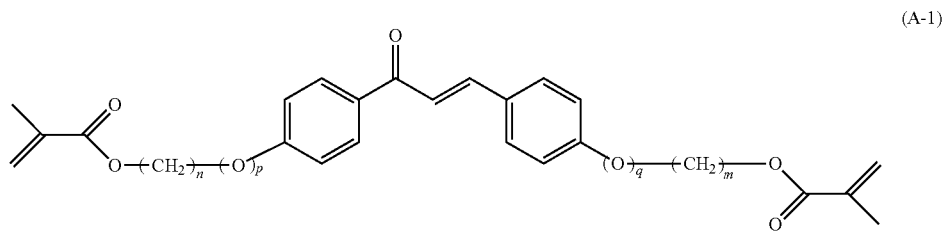

(A-1)

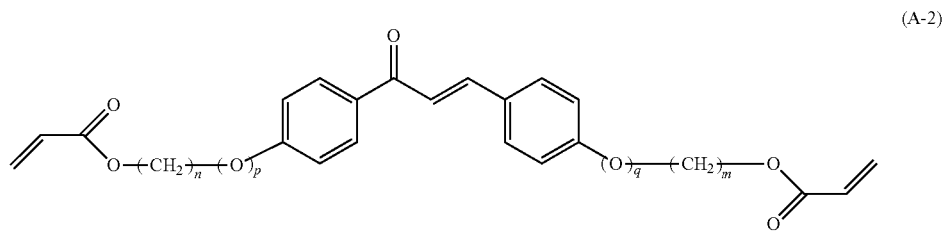

(A-2)

In the formula, p and q are the same as or different from each other, and are each 0 or 1, and m and n are the same as or different from each other and are each an integer of 0 to 6.

The specific preferred examples of the monomer represented by the formula (A) further include monomers represented by the following formulas (A-a) to (A-e). These monomers may be used alone or in combination with each other.

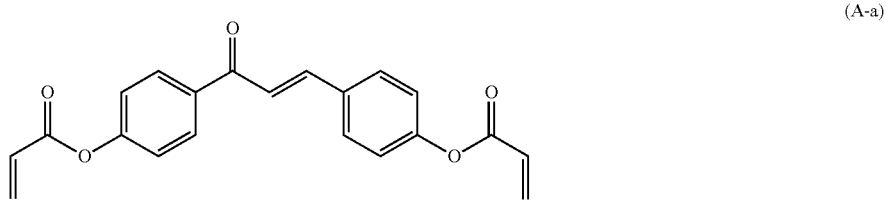

(A-a)

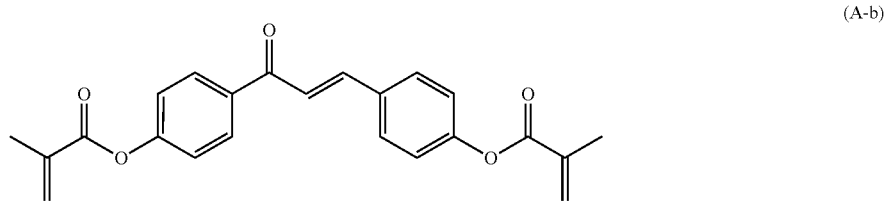

(A-b)

(A-c)
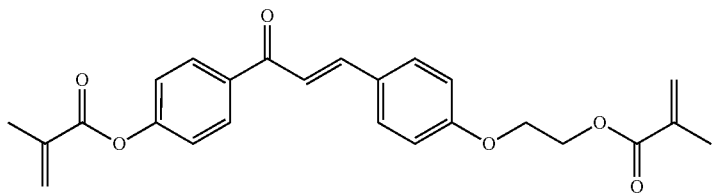

(A-d)
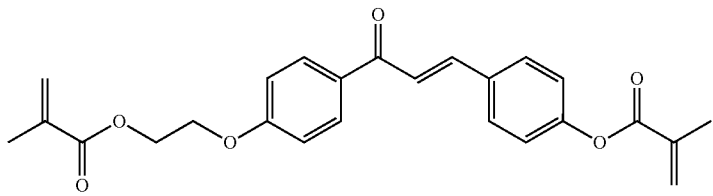

(A-e)
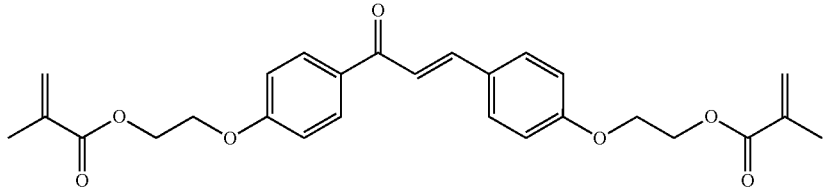

The monomer containing the azobenzene group preferably contains at least one monomer represented by the following formula (B).

(B)
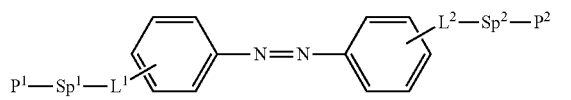

In the formula, $P^1$ and $P^2$ are the same as or different from each other, and are each an acryloyloxy, methacryloyloxy, acryloylamino, methacryloylamino, vinyl, or vinyloxy group; $Sp^1$ and $Sp^2$ are the same as or different from each other, and are each a C1-C10 linear, branched, or cyclic alkylene or alkenylene group, or a direct bond; $L^1$ and $L^2$ are the same as or different from each other, and are each an amino (—N(H)—), oxy (—O—), or thio (—S—) group, or a direct bond; and at least one hydrogen atom of each phenylene group may be replaced.

In the formula (B), at least one hydrogen atom of each phenylene group may be replaced by a halogen atom (preferably a fluorine or chlorine atom), or a methyl, methoxy, ethyl, or ethoxy group.

Specific preferred examples of the monomer represented by the formula (B) include monomers represented by the following formulas (B-1) to (B-11). These may be used alone or in combination with each other.

(B-1)
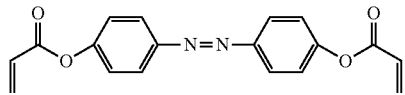

(B-2)
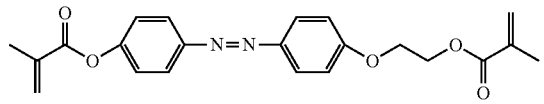

(B-3)
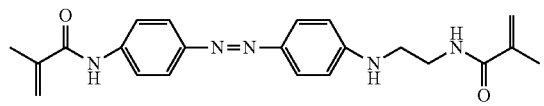

(B-4)
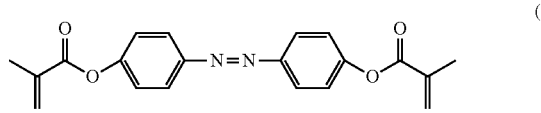

(B-5)
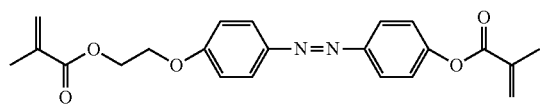

(B-6)
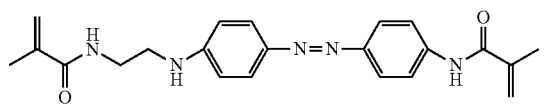

(B-7)
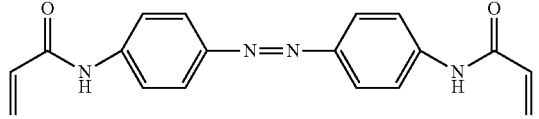

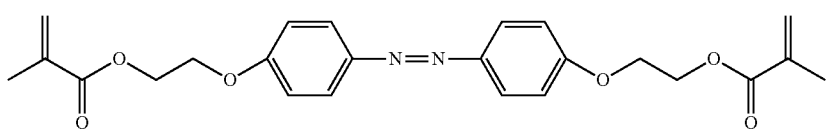
(B-8)

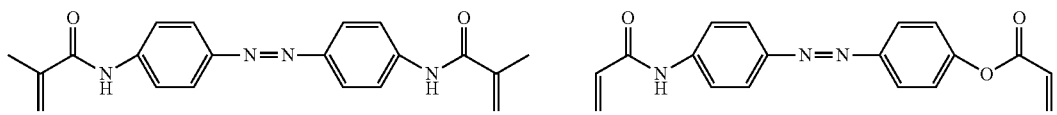
(B-9)    (B-10)

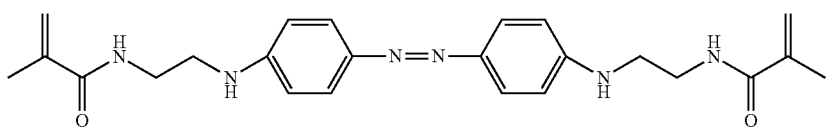
(B-11)

The at least one monomer may contain a monomer containing a biphenyl group and an alkyl group (hereinafter, also referred to simply as a biphenyl-based monomer). In this case, the polymer may contain a biphenyl group and an alkyl group. With such a polymer, for example, the pre-tilt angle can be made greater than 0°, so that the response speed of the liquid crystal diffraction grating 1 can be further increased. The biphenyl-based monomer may not contain an alkyl group.

The biphenyl-based monomer is usually used together with the monomer containing the polarized light-absorbing functional group. In this case, the polymer is a copolymer having a unit derived from the monomer containing a polarized light-absorbing functional group and a unit derived from the biphenyl-based monomer.

The biphenyl-based monomer may be a polyfunctional monomer containing multiple polymerizable groups, but is preferably a monofunctional monomer containing one polymerizable group.

The biphenyl group of the biphenyl-based monomer may contain a substituent. The substituent may be of any type and is preferably, for example, a halogen, methyl, methoxy, ethyl, or ethoxy group. These may be used alone or in combination with each other. In other words, the substituent preferably contains at least one substituent selected from the group consisting of halogen, methyl, methoxy, ethyl, and ethoxy groups. The at least one monomer may contain a monomer containing a biphenyl group with a substituent and a monomer containing a biphenyl group without a substituent. The halogen group is preferably a fluoro group or a chloro group. In the case where the biphenyl group contains a substituent, the substituent usually replaces at least one hydrogen atom in a ring structure (e.g., benzene ring) in the biphenyl group.

The alkyl group of the biphenyl-based monomer may be linear or branched, but is preferably linear. The number of carbon atoms in the alkyl group of the biphenyl-based monomer may be any number and may appropriately be determined, but is preferably 1 to 24, more preferably 2 to 18, still more preferably 4 to 12. With the number of carbon atoms of more than 24, the tilt angle can be effectively provided, but is likely to change with time. A monomer with no alkyl group can also be used, but the liquid crystal solubility slightly decreases.

The biphenyl-based monomer preferably contains at least one monomer represented by the following formula (C).

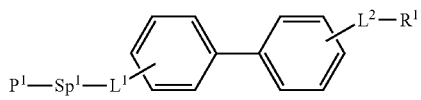
(C)

In the formula, $P^1$ is an acryloyloxy, methacryloyloxy, acryloylamino, or methacryloylamino group; $Sp^1$ is a C1-C10 linear, branched, or cyclic alkylene or alkenylene group, or a direct bond; $L^1$ and $L^2$ are the same as or different from each other, and are each an amino (—N(H)—), oxy (—O—), or thio (—S—) group, or a direct bond; $R^1$ is a C1-C24 linear, branched, or cyclic saturated or unsaturated alkyl or alkenyl group; and at least one hydrogen atom of each phenylene group may be replaced.

In the formula (C), at least one hydrogen atom of each phenylene group may be replaced by a halogen atom (preferably a fluorine or chlorine atom), or a methyl, methoxy, ethyl, or ethoxy group.

The alignment-controlling layers 50 and 60 may contain an additive that is adsorptive to the electrodes 11 and 21. Also with such an additive, the pre-tilt angle can be made greater than 0°, so that the response speed of the liquid crystal diffraction grating 1 can be further increased.

Whether or not the additive is adsorptive to the electrodes 11 and 21 can be determined by the following method. If the additive adsorbs to the electrodes 11 and 21, the adsorption should be attributed to a hydrogen bond. Hence, a change in the pre-tilt angle upon heating the liquid crystal diffraction grating 1 should be attributed to provision of a pre-tilt angle by absorption of the additive to the electrodes 11 and 21. The heating temperature is adjusted within the range of 25° C. to 100° C.

The additive is added, together with the at least one monomer, to the liquid crystal material (liquid crystal composition), and is sealed between the substrates 10 and 20. The additive sealed between the substrates 10 and 20 adsorbs to the electrodes 11 and 21. Application of ultraviolet rays to the liquid crystal layer 30 causes the monomer to polymerize, forming a polymer layer on the additive. In other words, with the additive, the alignment-controlling layers 50 and 60 each have a stacked structure of the additive layer and the polymer layer.

The additive is a compound which is not a monomer (which does not contain a polymerizable group). The additive preferably contains a terminal hydroxy, amino, or carboxyl group, to adsorb to the electrodes 11 and 21 made of ITO via a hydrogen bond.

Specific examples of the additive include, but are not particularly limited to, additives containing hydroxy, biphenyl, and alkyl groups. The hydroxy group makes the additive selectively adsorptive to the electrodes 11 and 21 made of ITO. The biphenyl group and the alkyl group contribute to a stable tilt angle. The additive may not contain an alkyl group in some cases.

The biphenyl group of the additive may contain a substituent. The substituent may be of any type and is preferably, for example, a halogen, methyl, methoxy, ethyl, or ethoxy group. These may be used alone or in combination with each other. In other words, the substituent preferably contains at least one substituent selected from the group consisting of halogen, methyl, methoxy, ethyl, and ethoxy groups. The additive may include an additive containing a substituent and an additive containing no substituent. The halogen group is preferably a fluoro or chloro group. In the case where the biphenyl group contains a substituent, the substituent usually replaces at least one hydrogen atom in a ring structure (e.g., benzene ring) in the biphenyl group.

The alkyl group of the additive may be linear or branched, but is preferably linear. The number of carbon atoms in the alkyl group of the additive may be any number and may appropriately be determined, but is preferably 1 to 24, more preferably 2 to 18, still more preferably 4 to 12. With the number of carbon atoms of more than 24, the tilt angle can be effectively provided, but is likely to change with time. An additive with no alkyl group can also be used, but the liquid crystal solubility slightly decreases.

The additive preferably includes at least one additive represented by the following formula (D).

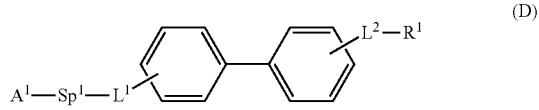

In the formula, $A^1$ is a hydroxy, carboxyl, or amino group; $Sp^1$ is a C1-C10 linear, branched, or cyclic alkylene or alkenylene group, or a direct bond; $L^1$ and $L^2$ are the same as or different from each other, and are each an amino (—N(H)—), oxy (—O—), or thio (—S—) group, or a direct bond; $R^1$ is a C1-C24 linear, branched, or cyclic saturated or unsaturated alkyl or alkenyl group; and at least one hydrogen atom of each phenylene group may be replaced.

In the formula (D), at least one hydrogen atom of each phenylene group may be replaced by a halogen atom (preferably a fluorine or chlorine atom), or a methyl, methoxy, ethyl, or ethoxy group.

Figure 7:
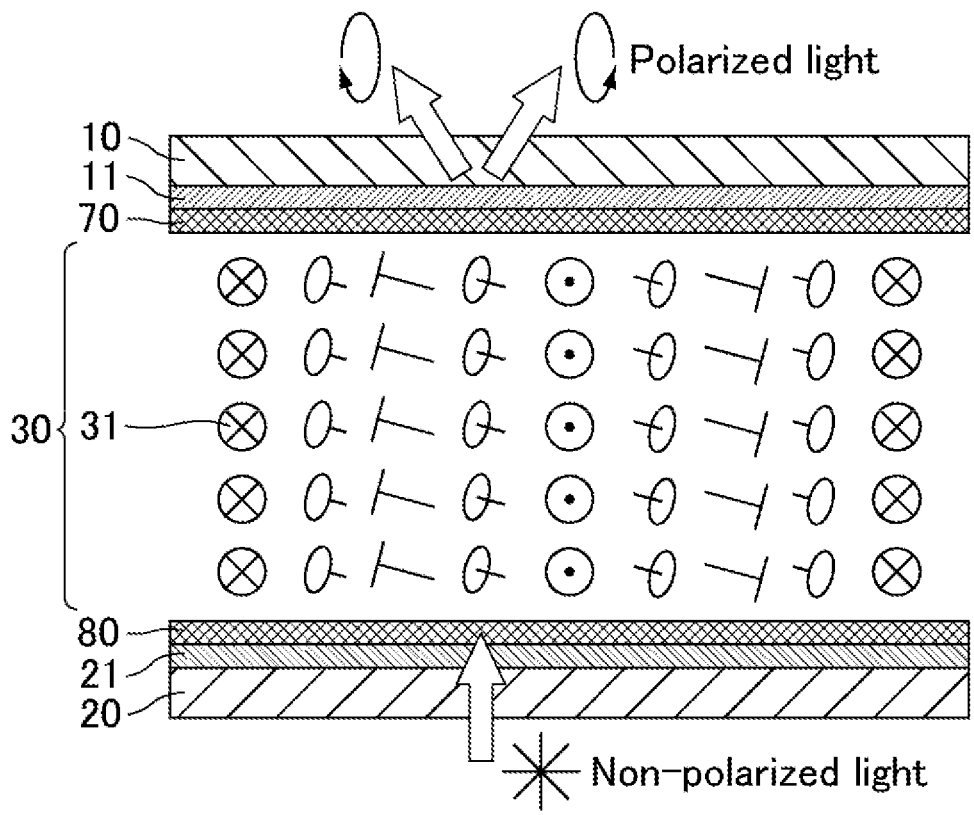
FIG. 7 is a schematic cross-sectional view of the liquid crystal diffraction grating of Embodiment 1 in which an alignment film is disposed on each of the substrates, with no voltage applied.

FIG. 7 is a schematic cross-sectional view of the liquid crystal diffraction grating of Embodiment 1 in which an alignment film is disposed on each of the substrates, with no voltage applied. As shown in FIG. 7, on the surfaces adjacent to the liquid crystal layer 30 of the substrates 10 and 20, i.e., on the surfaces adjacent to the liquid crystal layer 30 of the electrodes 11 and 21, alignment films 70 and 80 may respectively be disposed. The alignment film 70 is disposed between the alignment-controlling layer 50 and the substrate 10, and the alignment film 80 is disposed between the alignment-controlling layer 60 and the substrate 20. Also with these alignment films 70 and 80, the pre-tilt angle can be made greater than 0°, so that the response speed of the liquid crystal diffraction grating 1 can be further increased.

The alignment films 70 and 80 can be alignment films usually used in the field of liquid crystal display devices. Examples thereof include a monolayer film formed from at least one selected from a polyimide, a polyamic acid, a polyamide, a polymaleimide, a polysiloxane, a polysilsesquioxane, a polyphosphazene, and a copolymer thereof; a multilayer film; and a film obtained by oblique deposition of silicon oxide. Preferably, the alignment films 70 and 80 each contain at least one selected from a polyamic acid and a polyimide (hereinafter, also referred to as a polyimide-based polymer). Thereby, the stability of the alignment films 70 and 80 against heat can be enhanced.

The polyimide that can be contained in the alignment films 70 and 80 may be a polyimide obtained by partially imidizing a polyamic acid (polyimide partially containing a polyamic acid structure) or a polyimide obtained by fully imidizing a polyamic acid (polyamide containing no polyamic acid). The alignment films 70 and 80 may each contain one polyimide-based polymer or two or more different polyimide-based polymers.

The polyimide-based polymer is a polymer containing a structure derived from a diamine and a structure derived from a tetracarboxylic dianhydride as repeating structures, and is obtained by polymerizing at least one diamine and at least one tetracarboxylic dianhydride. The polyimide-based polymer contains a polyamic acid structure represented by the following formula (P-1) and/or a polyimide structure represented by the following formula (P-2).

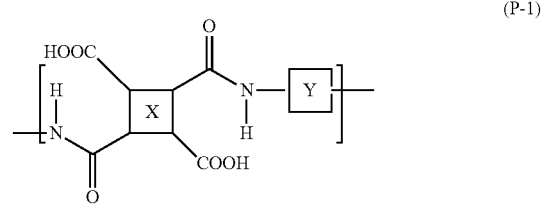

In the formula, X is a tetravalent organic group and Y is a trivalent organic group.

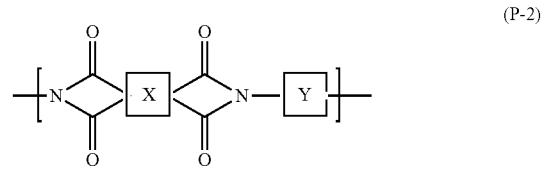

In the formula, X is a tetravalent organic group and Y is a trivalent organic group.

In one molecule of the polyimide-based polymer, X and Y may each include one group or two or more groups.

The alignment films 70 and 80 may not be subjected to alignment treatment, but are preferably subjected to alignment treatment. The alignment treatment method is not particularly limited and may be rubbing or photo-alignment, for example.

In the case where the alignment films 70 and 80 are those subjected to photo-alignment treatment, the alignment films 70 and 80 each preferably contain a polymer with a photo-functional group. The photo-functional group of each of the alignment films 70 and 80 is preferably a functional group that undergoes a structural change such as dimerization (formation of dimers), isomerization, photo-Fries rearrangement, and decomposition when irradiated with light (electromagnetic waves) such as ultraviolet light or visible light, and thereby exerts an alignment-controlling force. Specific examples of the photo-functional group of each of the alignment films 70 and 80 include azobenzene, chalcone, cinnamate, coumarin, tolane, and stilbene groups.

Liquid Crystal Composition

First, second, and third liquid crystal compositions in the present embodiment are described.

The first liquid crystal composition in the present embodiment contains a liquid crystal material and at least one selected from a monomer containing a chalcone group and a monomer containing an azobenzene group (hereinafter, also referred to as a polarized light absorbing monomer).

The second liquid crystal composition in the present embodiment contains a liquid crystal material, at least one selected from a monomer containing a chalcone group and a monomer containing an azobenzene group (polarized light absorbing monomer), and a monomer containing a biphenyl group and an alkyl group (biphenyl-based monomer).

The third liquid crystal composition of the present embodiment contains a liquid crystal material, at least one selected from a monomer containing a chalcone group and a monomer containing an azobenzene group (polarized light absorbing monomer), and an additive containing hydroxy, biphenyl, and alkyl groups.

The first, second, and third liquid crystal compositions of the present embodiment are suitable for formation of the liquid crystal layer 30 and the alignment-controlling layers 50 and 60 of the liquid crystal diffraction grating 1. The alignment-controlling layers 50 and 60 can be formed by polymerizing the polarized light absorbing monomer. With the first liquid crystal composition in the present embodiment, the resulting alignment-controlling layers 50 and 60 provide a pre-tilt angle of substantially 0°. With the second liquid crystal composition in the present embodiment, the resulting alignment-controlling layers 50 and 60 contain a polymer containing a biphenyl group and an alkyl group. With the third liquid crystal composition in the present embodiment, the resulting alignment-controlling layers 50 and 60 contain an additive. The constituents (e.g., liquid crystal material, monomer) of the first, second, and third liquid crystal compositions in the present embodiment are as described above, and thus the description is not repeated below.

The first liquid crystal composition in the present embodiment preferably has a polarized light absorbing monomer content (concentration) of 0.1 wt % or higher and 10 wt % or lower, more preferably 0.25 wt % or higher and 6 wt % or lower, still more preferably 0.3 wt % or higher and 3 wt % or lower. If the content is lower than 0.1 wt %, the alignment control may not be conducted uniformly over the entire region of the liquid crystal layer 30. In contrast, if the content is higher than 10 wt %, the alignment control can be conducted but unreacted monomers may remain in the liquid crystal layer 30. If unreacted monomers remain in the liquid crystal layer 30 and polymerized during use, they may cause misalignment.

The second liquid crystal composition in the present embodiment preferably has a polarized light absorbing monomer content (concentration) of 0.1 wt % or higher and 10 wt % or lower, more preferably 0.25 wt % or higher and 6 wt % or lower, still more preferably 0.3 wt % or higher and 3 wt % or lower. If the content is lower than 0.1 wt %, the alignment control may not be conducted uniformly over the entire region of the liquid crystal layer 30. In contrast, if the content is higher than 10 wt %, the alignment control can be conducted but unreacted monomers may remain in the liquid crystal layer 30. If unreacted monomers remain in the liquid crystal layer 30 and polymerized during use, they may cause misalignment.

The second liquid crystal composition in the present embodiment preferably has a biphenyl-based monomer content (concentration) that is equal to or lower than the polarized light absorbing monomer content (concentration) of the second liquid crystal composition in the present embodiment, more preferably equal to or lower than the half of the polarized light absorbing monomer content (concentration) of the second liquid crystal composition in the present embodiment. If the biphenyl-based monomer content is higher than the polarized light absorbing monomer content, the alignability decreases. The biphenyl-based monomer content (concentration) of the second liquid crystal composition in the present embodiment is preferably 1/10 or more of the polarized light absorbing monomer content (concentration) of the second liquid crystal composition in the present embodiment. If the biphenyl-based monomer content is less than 1/10 of the polarized light absorbing monomer content, the pre-tilt angle may not be provided or different pre-tilt angles may be provided in different regions.

The third liquid crystal composition in the present embodiment preferably has a polarized light absorbing monomer content (concentration) of 0.1 wt % or higher and 10 wt % or lower, more preferably 0.25 wt % or higher and 6 wt % or lower, still more preferably 0.3 wt % or higher and 3 wt % or lower. If the content is lower than 0.1 wt %, the alignment control may not be conducted uniformly over the entire region of the liquid crystal layer 30. In contrast, if the content is higher than 10 wt %, the alignment control can be conducted but unreacted monomers may remain in the liquid crystal layer 30. If unreacted monomers remain in the liquid crystal layer 30 and polymerized during use, they may cause misalignment.

The third liquid crystal composition in the present embodiment preferably has an additive content (concentration) that is equal to or lower than the polarized light absorbing monomer content (concentration) of the third liquid crystal composition in the present embodiment, more preferably equal to or lower than the half of the polarized light absorbing monomer content (concentration) of the third liquid crystal composition in the present embodiment. If the additive content is higher than the polarized light absorbing monomer content, the alignability decreases. The additive content (concentration) of the third liquid crystal composition in the present embodiment is preferably 1/10 or more of the polarized light absorbing monomer content (concentration) of the third liquid crystal composition in the present embodiment. If the additive content is less than 1/10 of the polarized light absorbing monomer content, the pre-tilt angle may not be provided or different pre-tilt angles may be provided in different regions.

The biphenyl-based monomer is particularly preferably a monomer represented by the following formula (2). Such a monomer contributes to uniform, stable provision of a pre-tilt angle. In other words, such a monomer can reduce the pre-tilt angle variation at different positions and can reduce the change in the pre-tilt angle with time. The monomer represented by the following formula (2) is also preferred in terms of high liquid crystal solubility.

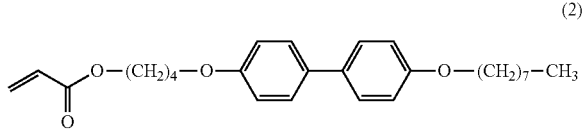

(2)

The monomer represented by the formula (2) is a monofunctional monomer containing a non-substituted biphenyl group, a C8 linear alkyl group, and an acryloyloxy group as a polymerizable group.

The additive is particularly preferably an additive represented by the following formula (4). The hydroxy group makes the additive selectively adsorptive to the electrodes 11 and 21 made of ITO. The biphenyl group and the alkyl group contribute to a stable tilt angle. The additive represented by the following formula (4) is also preferred in terms of high liquid crystal solubility and easy phase separation from the liquid crystal.

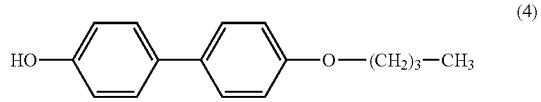

(4)

Wire Grid Polarizer

Figure 8:
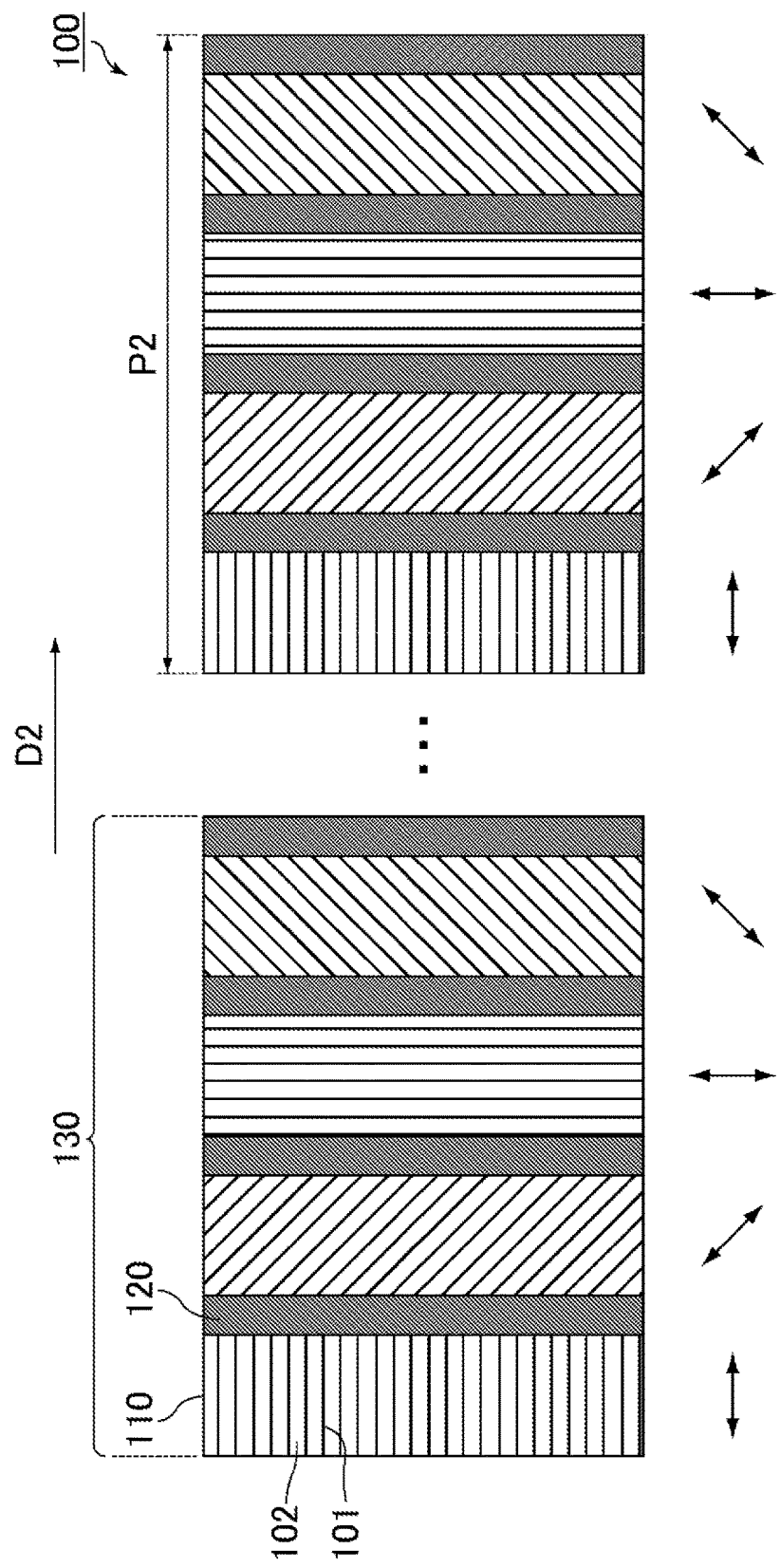
FIG. 8 is a schematic plan view of a wire grid polarizer of Embodiment 1.

The wire grid polarizer of the present embodiment is described. FIG. 8 is a schematic plan view of a wire grid polarizer of Embodiment 1. The double-headed arrows in FIG. 8 each show the polarization axis direction of linearly polarized light passed through the wire grid polarizer. A wire grid polarizer 100 of the present embodiment includes, as shown in FIG. 8, linear wires 101 whose orientation periodically rotates in a direction D2.

Light vibrating in the direction perpendicular to the wires 101 is passed through the polarizer, whereas light vibrating in the direction parallel to the wires 101 is reflected by the polarizer. Hence, when unpolarized light is applied to the wire grid polarizer 100, linearly polarized light vibrating in the direction 90° rotated from the orientation of the wires 101 is passed through the polarizer and the vibration direction (polarization direction) of the linearly polarized light passed through the polarizer also periodically rotates in the direction D2. Application of unpolarized ultraviolet rays through the wire grid polarizer 100 to the first, second, or third liquid crystal composition in the present embodiment sealed between the substrates 10 and 20 therefore means application of linearly polarized ultraviolet rays whose vibration direction periodically rotates in the direction D2 to the liquid crystal composition. This polymerizes the polarized light absorbing monomer in the certain direction relative to the vibration direction to form the alignment-controlling layers 50 and 60. Thereby, the liquid crystal molecules 31 can be aligned to rotate periodically in response to the periodically rotating orientation of the wires 101.

The relationship between the vibration direction of linearly polarized ultraviolet rays applied to the liquid crystal composition (liquid crystal layer 30) and the orientation of the liquid crystal molecules 31 basically depends on the photo-functional group of the monomer. With either of the chalcone group and the azobenzene group, the vibration direction and the orientation are perpendicular to each other.

The wires 101 are metal wires disposed on the transparent substrate 102. Each of the wires 101 has a width of, for example, 10 to 600 nm. The wires 101 are disposed at a pitch of, for example, 50 to 500 nm.

The orientation of the multiple wires 101 preferably half rotates in the direction D2 at a pitch P2 of 5 µm or more and 50 µm or less. If the pitch P2 is less than 5 µm, the wire grid polarizer 100 may not be produced. If the pitch P2 is more than 50 µm, light passing through the liquid crystal diffraction grating 1 may be insufficiently diffracted, decreasing the haze. The upper limit of the pitch P2 is more preferably 30 µm or less. If the pitch P2 is more than 30 µm, the superiority of the liquid crystal diffraction grating 1 in terms of the haze and the contrast ratio to a device utilizing light scattering of PDLC, for example, may be lost. The pitch P2 is still more preferably 8 µm or more and 16 µm or less.

As shown in FIG. 8, the wire grid polarizer 100 includes regions arranged in the direction D2 (hereinafter, also referred to as WG regions) 110. In each WG region 110, the wires 101 are arranged in the same direction (including substantially the same direction). In other words, a region in which the wires 101 are arranged in the same direction corresponds to a WG region 110. The orientation of the wires 101 in each WG region 110 rotates by a predetermined angle in the neighboring WG region 110 in the arrangement direction of the WG regions 110. In other words, the orientation of the wires 101 in each WG region 110 rotates by a predetermined angle in the neighboring WG region 110 when the WG regions 110 are observed in the direction D2. With this structure, the wire grid polarizer 100 can be easily produced.

The predetermined angle is not particularly limited and may appropriately be determined. The twist angle of polarized light passed through the liquid crystal diffraction grating 1 is preferably uniform, for uniform diffraction. For example, the angle is preferably not greatly deviated from 45°, the midpoint of a twist between 0° and 90°. From this viewpoint, the predetermined angle is preferably 40° to 50°, more preferably 44° to 46°, still more preferably 44.5° to 45.5°, particularly preferably substantially 45°.

As shown in FIG. 8, a light-shielding region 120 may be provided between two neighboring WG regions 110 in the direction D2. The light-shielding region 120 can be a patterned component formed from the same metal as the wires 101.

The width of each WG region 110 in the direction D2 is preferably wider than, more preferably twice or more, the width of each light-shielding region 120 in the direction D2. If the width of each light-shielding region 120 in the direction D2 is wider than the width of each WG region 110 in the direction D2, the widths of regions without liquid crystal alignment control in the liquid crystal diffraction grating 1 are wide, with which the liquid crystal diffraction grating 1 may not be able to suitably control the polarization.

As shown in FIG. 8, in the wire grid polarizer 100, the same structure (basic structure) 130 is repeated for each pitch P2, and over the basic structure 130, the orientation of the wires 101 half rotates.

The wire grid polarizer 100 can be produced by interference exposure, for example. Specifically, the wire grid polarizer 100 may be produced by the following procedure. First, an anti-reflection film is formed on the back surface of a wafer substrate, and an aluminum thin film is formed on the front surface of the wafer substrate. On the aluminum thin film are formed an anti-reflection film and a photoresist in the given order. The photoresist is subjected to double-beam interference exposure using a deep ultraviolet (DUV)

laser. The photoresist is exposed such that the regions corresponding to the same WG region 110 with the same orientation of the wires 101 are simultaneously exposed through a mask while the direction of the interference fringes is rotated. The workpiece is then subjected to development, so that the grid patterns of the resist are formed. This process forms a photoresist in the same patterns as those shown in FIG. 8. The aluminum thin film is then dry-etched with the photoresist as a mask, followed by removal of the photoresist. This process forms the grid patterns of the wires 101. A protective film is formed to cover the wires 101 by chemical vapor deposition (CVD) of $SiO_2$, for example. The wafer substrate is then cut into pieces of a predetermined size, whereby the wire grid polarizer 100 is cut out.

Method for Producing Liquid Crystal Diffraction Grating

The method for producing a liquid crystal diffraction grating according to the present embodiment is a method for producing a liquid crystal diffraction grating switchable between a diffraction state and a transparent state upon application of voltage to the paired electrodes disposed on the paired substrates between which the liquid crystal layer is held.

The steps of the method are further described below. The members and monomers, for example, are as described above and thus the descriptions are not repeated below. The method for producing a liquid crystal diffraction grating according to the present embodiment can utilize techniques used in production of a common liquid crystal display device.

The method for producing a liquid crystal diffraction grating according to the present embodiment may include forming an alignment film on each of the substrates and subjecting the alignment films to alignment treatment. The alignment films may each contain at least one polymer (polyimide-based polymer) selected from a polyamic acid and a polyimide. Thereby, the pre-tilt angle in the resulting liquid crystal diffraction grating can be made greater than 0°, and the response speed of the liquid crystal diffraction grating can be further increased.

The formation of the alignment films is performed before formation of a liquid crystal layer described later. In the formation of the alignment films, a liquid crystal alignment agent obtained by dissolving the polyimide-based polymer in a solvent is applied to each substrate (surface of each substrate adjacent to the electrodes) by spin coating or slit coating, for example. The agent is pre-baked at 60° C. to 100° C. for 1 to 10 minutes, and post-baked at 180° C. to 230° C. for 10 to 60 minutes.

The alignment films are subjected to alignment treatment. The direction of the alignment treatment for each alignment films is as follows. That is, the alignment treatment is performed such that the alignment treatment directions of the substrates, when disposed to each other, are opposite from and parallel to each other (antiparallel). The opposite directions include directions different from each other by substantially 180°. The parallel directions include substantially parallel directions. The alignment treatment for each alignment film is preferably rubbing or photo-alignment treatment. Examples of the photo-alignment treatment include application of linearly polarized ultraviolet rays.

The production conditions such as the materials of the alignment films, film formation conditions, and alignment treatment are usually common but may appropriately be changed.

In the formation of the alignment films, an alignment film may be formed only on one of the substrates and subjected to alignment treatment. In this case, the pre-tilt angle can be made greater than 0° near the substrate with an alignment film formed in the resulting liquid crystal diffraction grating, and can be made substantially 0° near the substrate with no alignment film formed. With this structure, the response speed of the liquid crystal diffraction grating can be increased, although not as much as in the case of forming an alignment film on each of the substrates.

A liquid crystal layer is formed by sealing a liquid crystal composition containing a liquid crystal material and at least one monomer between the substrates bonded to each other. The liquid crystal composition can be the first, second, or third liquid crystal composition.

In the formation of a liquid crystal layer, the sealant may not be cured as long as the liquid crystal composition is held between the substrates by the sealant. The sealant may be cured at the same time as or different time from the formation of an alignment-controlling layer. The sealant may be curable using light such as ultraviolet rays or heat, or may be curable using both light and heat, as described above.

The liquid crystal layer can be formed by injecting a liquid crystal composition between the substrates by vacuum filling or one drop filling utilized in production of a liquid crystal display device, for example. With vacuum filling, a liquid crystal layer is formed by performing application of a sealant, bonding of the substrates, curing of the sealant, injection of the liquid crystal composition, and sealing of the injection ports in the given order. With one drop filling, a liquid crystal layer is formed by performing application of a sealant, dropping of a liquid crystal composition, bonding of the substrates, and curing of the sealant in the given order. At this stage, the alignment of the liquid crystal molecules in the liquid crystal material is not controlled.

An alignment-controlling layer is formed between the liquid crystal layer and each of the substrates by applying ultraviolet rays to the liquid crystal layer and polymerizing the at least one monomer. The ultraviolet rays are preferably linearly polarized ultraviolet rays. The alignment-controlling layers align liquid crystal molecules in the liquid crystal material in the direction parallel to the substrates. Thereby, in a plan view of the liquid crystal layer in the horizontal alignment state where the liquid crystal molecules are aligned in the direction parallel to the substrates, the orientation of the liquid crystal molecules periodically rotates in one direction.

Without the formation of an alignment film, the alignment-controlling layer is formed at the interface between each of the substrates and the liquid crystal layer. With the formation of an alignment film, the alignment-controlling layer is formed at the interface between the substrate or alignment film and the liquid crystal layer. When alignment films are formed on the respective substrates, the alignment-controlling layers are formed at the respective interfaces of the alignment films and the liquid crystal layer. When an alignment film is formed only on one of the substrates, one of the alignment-controlling layers is formed at the interface between the alignment film and the liquid crystal layer, and the other at the interface between the substrate with no alignment film and the liquid crystal layer.

In the formation of an alignment-controlling layer, the liquid crystal layer is preferably irradiated with ultraviolet rays through a wire grid polarizer. This easily aligns the liquid crystal molecules such that they rotate periodically. The wire grid polarizer can be the wire grid polarizer of the present embodiment described above. In this case, the direction D1 is parallel or perpendicular to the direction D2.

Figure 9A:
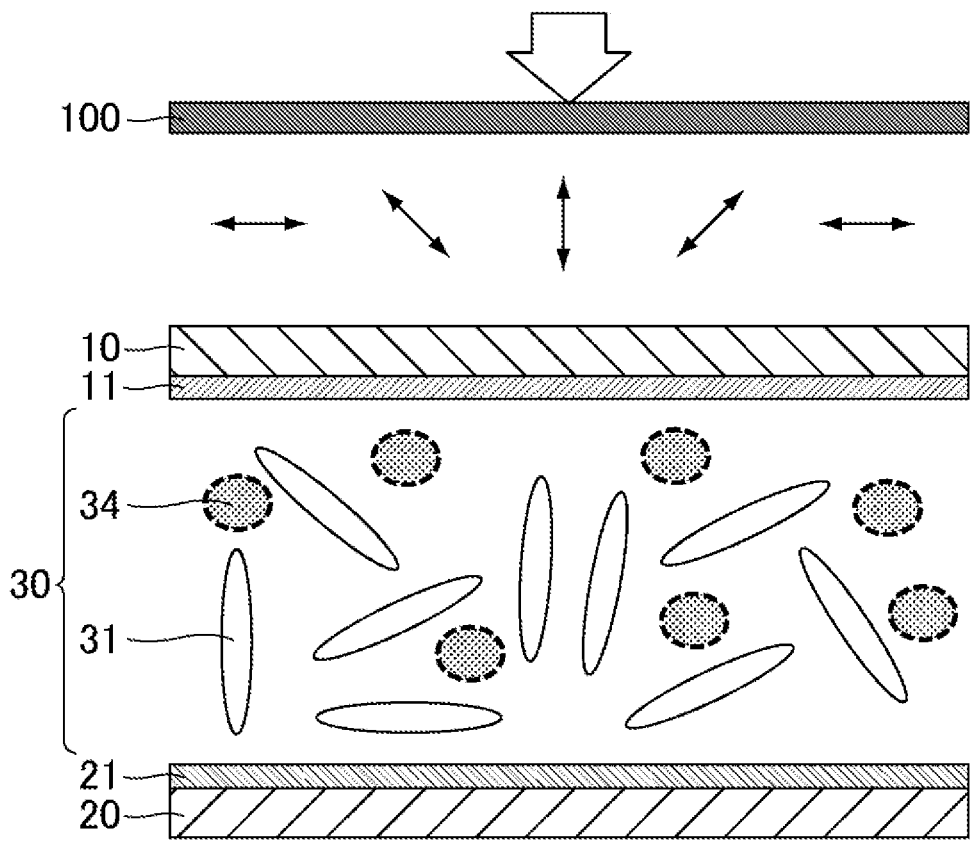
FIG. 9A and FIG. 9B are schematic views illustrating formation of an alignment-controlling layer in a method for producing the liquid crystal diffraction grating of Embodiment 1.
Figure 9B:
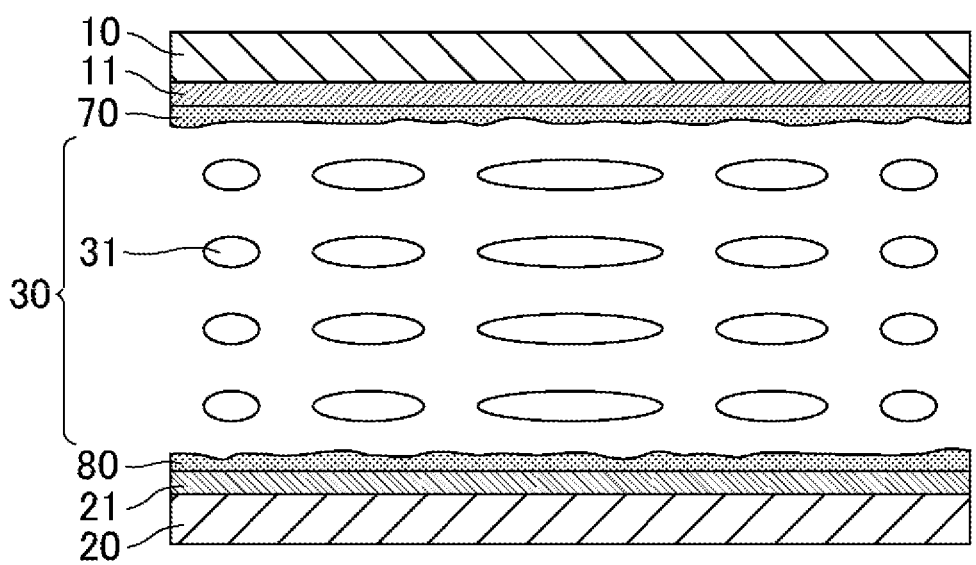

FIG. 9A and FIG. 9B are schematic views illustrating formation of an alignment-controlling layer in a method for producing the liquid crystal diffraction grating of Embodiment 1; FIG. 9A shows the state before polymerization of a monomer and FIG. 9B shows the state after the polymerization of the monomer. In FIG. 9A, the white arrow shows ultraviolet rays. As shown in FIG. 9A, ultraviolet rays are applied through the wire grid polarizer 100 while the liquid crystal layer 30 is heated which contains a liquid crystal material with the liquid crystal molecules 31 and at least one monomer 34. Thereby, at least one monomer 34 is polymerized and thus a polymer is produced. The polymer is phase-separated from the liquid crystal layer 30, so that the alignment-controlling layers 50 and 60 are formed between the respective substrates 10 and 20 and the liquid crystal layer 30 as shown in FIG. 9B.

In the formation of an alignment-controlling layer, ultraviolet rays are preferably applied to the liquid crystal layer while the liquid crystal layer is heated at a temperature equal to or higher than the nematic-isotropic transition temperature ($T_{NI}$) of the liquid crystal material. This reduces the influence of light scattering of the liquid crystal layer, aligning liquid crystal molecules to rotate periodically with a higher degree of precision. The upper limit of the heating temperature is preferably $T_{NI}$ of the liquid crystal material +10° C. to minimize deterioration of the liquid crystal material by heat. The conditions such as the heating duration and heating method are not particularly limited. The nematic-isotropic transition temperature ($T_{NI}$) of the liquid crystal material can be measured by, for example, differential scanning calorimetry (DSC) or a method in which a liquid crystal material is placed in a capillary and the temperature dependence is directly observed.

The formation of an alignment-controlling layer is performed after the formation of a liquid crystal layer, so that the substrates between which the liquid crystal layer is held is bonded to each other by a sealant and the alignment-controlling layers can be formed in a region surrounded by the sealant in a plan view. Also, the polarized light absorbing monomer (preferably the photo-reactive monomer) is polymerized as an alignment-controlling layer-forming monomer, so that alignment-controlling layers can be formed which align the liquid crystal material in the direction parallel to the substrate surfaces.

In the present embodiment, the case is described in which with no voltage applied, the liquid crystal molecules 31 are aligned in the direction parallel to the substrates 10 and 20. Yet, the liquid crystal molecules 31 may be aligned in the direction perpendicular to the substrates 10 and 20 with no voltage applied. In this case, at least one vertical alignment monomer is used as the monomer forming the alignment-controlling layers 50 and 60, and a liquid crystal material having negative anisotropy of dielectric constant is used. Thereby, the liquid crystal diffraction grating 1 can be in the transparent state with no voltage applied and in the diffraction state with voltage applied.

In the present embodiment, the case is described in which the liquid crystal molecules 31 periodically rotate only in one direction (direction D1). Yet, the liquid crystal molecules 31 may rotate in multiple directions. For example, the liquid crystal diffraction grating 1 may include a region in which the liquid crystal molecules 31 periodically rotate in the direction D1 and a region in which the liquid crystal molecules 31 periodically rotate in the direction perpendicular to the direction D1.

In the present embodiment, the case is described in which the alignment-controlling layers 50 and 60 are disposed on the respective substrates 10 and 20. Yet, only one of the alignment-controlling layers 50 and 60 may be disposed. For periodic rotation of the liquid crystal molecules 31 with a higher degree of precision, the alignment-controlling layers 50 and 60 are preferably disposed on the respective substrates 10 and 20. In the case of disposing an alignment-controlling layer only between one of the substrates 10 and 20 and the liquid crystal layer 30 and utilizing alignment film(s), an alignment film may be disposed between the alignment-controlling layer and each of the substrates 10 and 20 or an alignment film may be disposed only between the alignment-controlling layer and the substrate with the alignment-controlling layer disposed thereon.

The wire grid polarizer 100 may include different basic structures 130. For example, the wire grid polarizer 100 may include the basic structures 130 repeatedly, which are the first pattern, a second pattern with the orientation of the wires 101 in each WG region 110 in the first pattern being rotated by 90°, a third pattern with the orientation of the wires 101 in each WG region 110 in the first pattern being rotated by +45°, and a fourth pattern with the orientation of the wires 101 in each WG region 110 in the first pattern being rotated by −45°. Blocks each composed of the first, second, third, and fourth patterns arranged in two rows×two columns may be arranged in rows and columns.

Embodiment 2

In the present embodiment, the features unique to the present embodiment are mainly described, and features already described in Embodiment 1 are not described. Members having the same or similar function in the present embodiment and Embodiment 1 are provided with the same reference sign, and description of the member is not repeated in the present embodiment.

Figure 10:
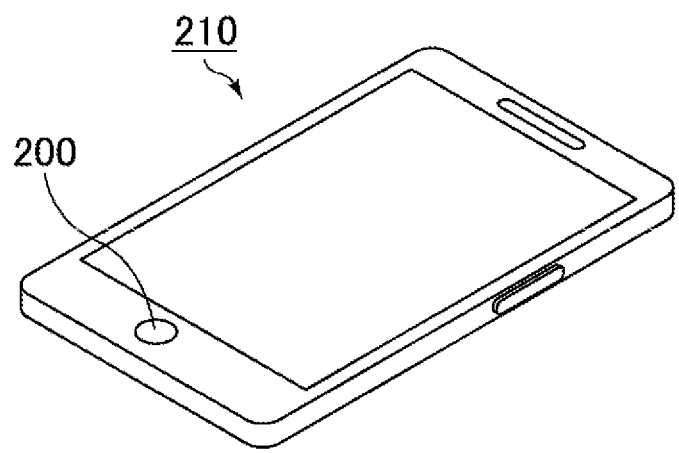
FIG. 10 is a schematic plan view of a recognition device of Embodiment 2.

FIG. 10 is a schematic plan view of a recognition device of Embodiment 2. As shown in FIG. 10, a recognition device 200 in the present embodiment is a several-millimeter-sized recognition device utilizing a liquid crystal diffraction grating, for example. The recognition device 200 includes the liquid crystal diffraction grating of Embodiment 1 (not illustrated) and a near-infrared sensor (not illustrated) disposed behind the liquid crystal diffraction grating, and utilizes infrared light in the near-infrared range. The recognition device 200 may be included in a mobile device such as a smartphone 210.

Figure 11:
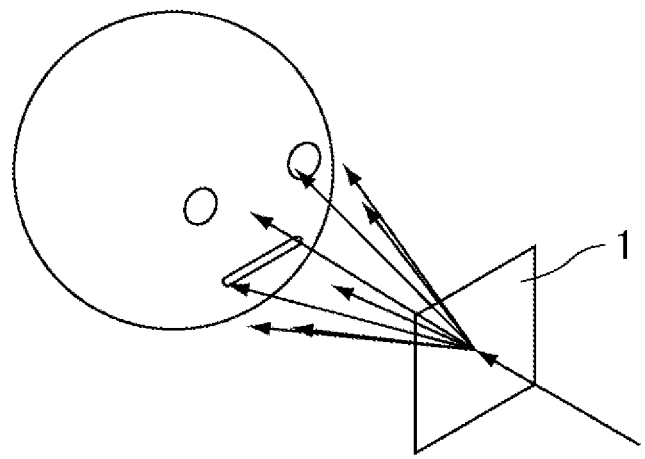
FIG. 11 is a schematic perspective view illustrating a use example of the recognition device of Embodiment 2, with the liquid crystal diffraction grating in a diffraction state.

FIG. 11 is a schematic perspective view illustrating a use example of the recognition device of Embodiment 2, with the liquid crystal diffraction grating in a diffraction state. As shown in FIG. 11, when the liquid crystal diffraction grating 1 is in the diffraction state (for example, with no voltage applied), near infrared light passed through the liquid crystal diffraction grating 1 is diffracted and spread. This allows recognition of a wide range of a face, for example.

Figure 12:
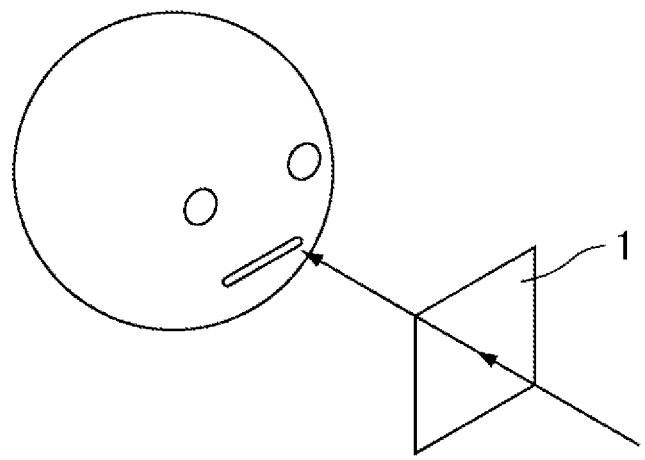
FIG. 12 is a schematic perspective view illustrating a use example of the recognition device of Embodiment 2, with the liquid crystal diffraction grating in a transparent state.

FIG. 12 is a schematic perspective view illustrating a use example of the recognition device of Embodiment 2, with the liquid crystal diffraction grating in a transparent state. As shown in FIG. 12, when the liquid crystal diffraction grating 1 is in the transparent state (for example, with voltage applied), near infrared light travels straight through the liquid crystal diffraction grating 1. This allows recognition of only a point (narrow range) of a face, for example.

In this manner, the liquid crystal diffraction grating 1 allows switching between a mode of recognizing a wide range and a mode of recognizing a small range. Recognition of a narrow range is performed with a high degree of sensitivity while recognition of a wide range is performed with a degree of sensitivity lower than that of a narrow range.

Embodiment 3

In the present embodiment, the features unique to the present embodiment are mainly described, and features already described in Embodiment 1 are not described. Members having the same or similar function in the present embodiment and Embodiment 1 are provided with the same reference sign, and description of the member is not repeated in the present embodiment.

Figure 13:
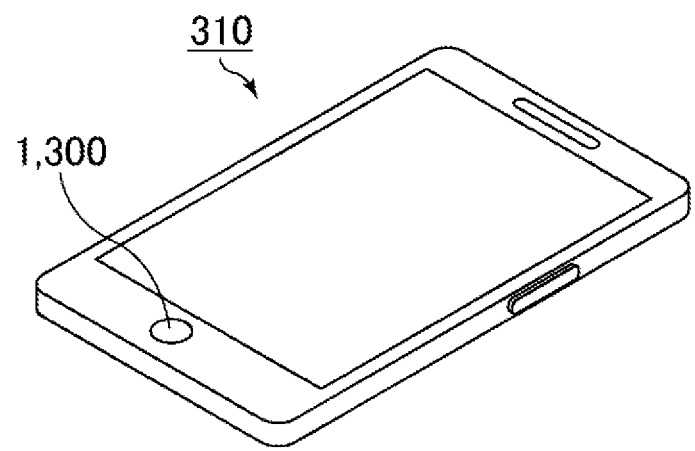
FIG. 13 is a schematic plan view of a switch of Embodiment 3.

FIG. 13 is a schematic plan view of a switch of Embodiment 3. As shown in FIG. 13, a switch 300 in the present embodiment is a several-millimeter-sized switch utilizing a liquid crystal diffraction grating, for example. The switch 300 includes the liquid crystal diffraction grating 1 of Embodiment 1, and utilizes light in the visible light range. The switch 300 may be included in a mobile device such as a smartphone 310.

For example, the liquid crystal diffraction grating 1 may temporarily be in the transparent state when the switch 300 is turned on, and may be in the diffraction state and appear white when the switch 300 is not turned on.

Embodiment 4

In the present embodiment, the features unique to the present embodiment are mainly described, and features already described in Embodiment 1 are not described. Members having the same or similar function in the present embodiment and Embodiment 1 are provided with the same reference sign, and description of the member is not repeated in the present embodiment.

Figure 14A:
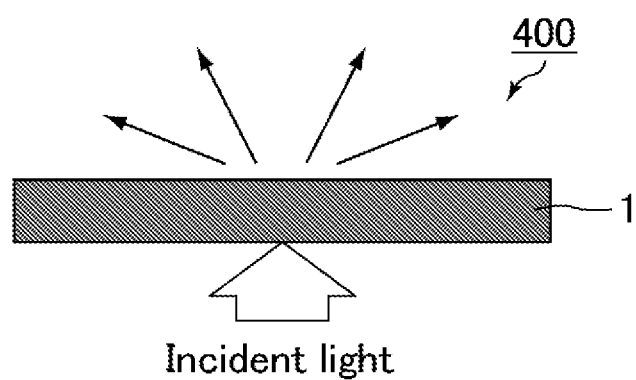
FIG. 14A and FIG. 14B are schematic cross-sectional views of a display of Embodiment 4.
Figure 14B:
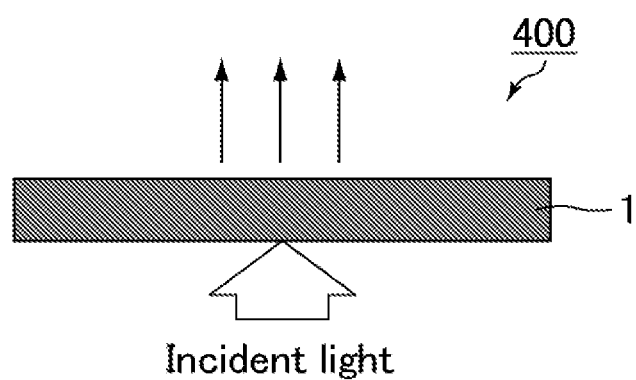

FIG. 14A and FIG. 14B are schematic cross-sectional views of a display of Embodiment 4; FIG. 14A shows a diffraction state of the liquid crystal diffraction grating and FIG. 14B shows a transparent state of the liquid crystal diffraction grating. As shown in FIGS. 14A and 14B, a display 400 in the present embodiment includes the liquid crystal diffraction grating 1 of Embodiment 1. The display 400, unlike a common liquid crystal display, requires no polarizer.

As shown in FIG. 14A, when the liquid crystal diffraction grating 1 is in the diffraction state (for example, with no voltage applied), light passed through the liquid crystal diffraction grating 1 is diffracted and spread, making the display 400 opaque.

As shown in FIG. 14B, when the liquid crystal diffraction grating 1 is in the transparent state (for example, with voltage applied), light travels straight through the liquid crystal diffraction grating 1, making the display 400 transparent.

With this principle, various display effects can be achieved.

Figure 15:
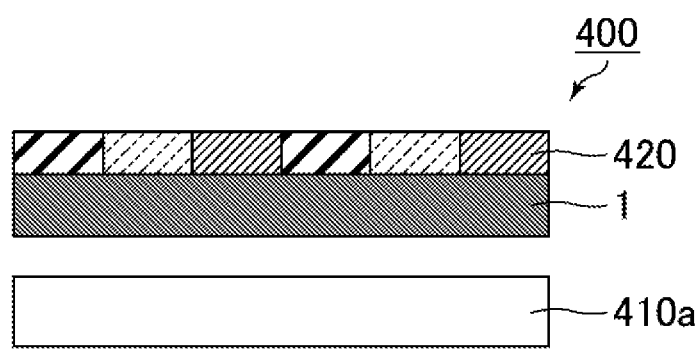
FIG. 15 is a schematic cross-sectional view of an application example of the display of Embodiment 4.

FIG. 15 is a schematic cross-sectional view of an application example of the display of Embodiment 4. As shown in FIG. 15, the display 400 in the present embodiment includes a backlight unit 410a disposed behind the liquid crystal diffraction grating 1, and color filters 420 disposed on the surface adjacent to the viewer of the liquid crystal diffraction grating 1. This structure enables the display 400 to provide color display. The backlight unit 410a employs a surface light source emitting white light. The color filters 420 include color filters of three colors, namely red, green, and blue, for example.

Figure 16:
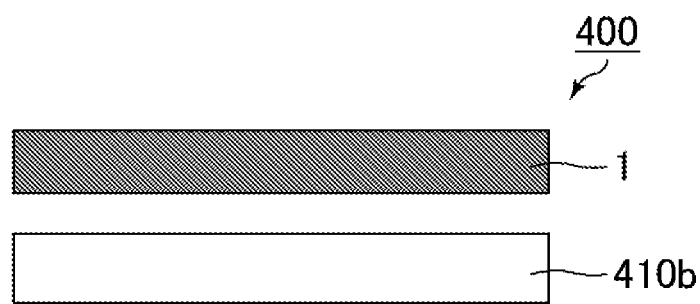
FIG. 16 is a schematic cross-sectional view of another application example of the display of Embodiment 4.

FIG. 16 is a schematic cross-sectional view of another application example of the display of Embodiment 4. As shown in FIG. 16, the display 400 in the present embodiment includes a backlight unit 410b disposed behind the liquid crystal diffraction grating 1. The backlight unit 410b employs a surface light source capable of emitting light rays of multiple colors (for example, three colors of red, green, and blue) sequentially. This structure also enables the display 400 to provide color display.

In the present embodiment, at least one of the paired electrodes of the liquid crystal diffraction grating 1 may include electrode members which are disposed in the respective pixels and driven by the corresponding switching elements such as thin-film transistors. These pixels enable display of various images.

The display 400 is usable as a reflective or projective display.

The present invention is described in more detail based on the following examples and comparative examples. The examples, however, are not intended to limit the scope of the present invention.

Examples 1A to 1D

Liquid Crystal Composition Containing Monomer

A 1.0 wt % monomer represented by the following formula (1) was dissolved in a liquid crystal material having positive anisotropy of dielectric constant ($T_{NI}$=75° C., $\Delta n$=0.155, $\Delta\varepsilon$=10). The mixture was left to stand at 25° C. for 24 hours to dissolve the monomer in the liquid crystal material completely. Thereby, a liquid crystal composition was prepared.

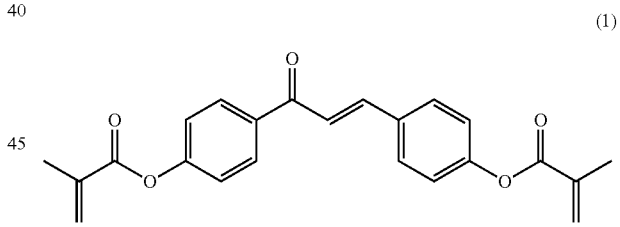

(1)

Production of Liquid Crystal Diffraction Grating

Paired substrates each including an ITO electrode were prepared. A sealant was applied to one of the substrates, and the liquid crystal composition obtained above was dropped in a region surrounded by the sealant. The substrate was bonded to the other substrate, so that a liquid crystal cell was produced. The sealant was a heat-curable sealant, an ultraviolet-curable sealant, or a heat- and ultraviolet-curable sealant. Unpolarized ultraviolet rays were applied to the wire grid polarizer with the liquid crystal cell temperature set equal to or higher than the $T_{NI}$ (95° C.), so that linearly polarized ultraviolet rays were applied to the liquid crystal cell from the normal direction through the wire grid polarizer with an intensity of 2 J/cm².

Figure 17:
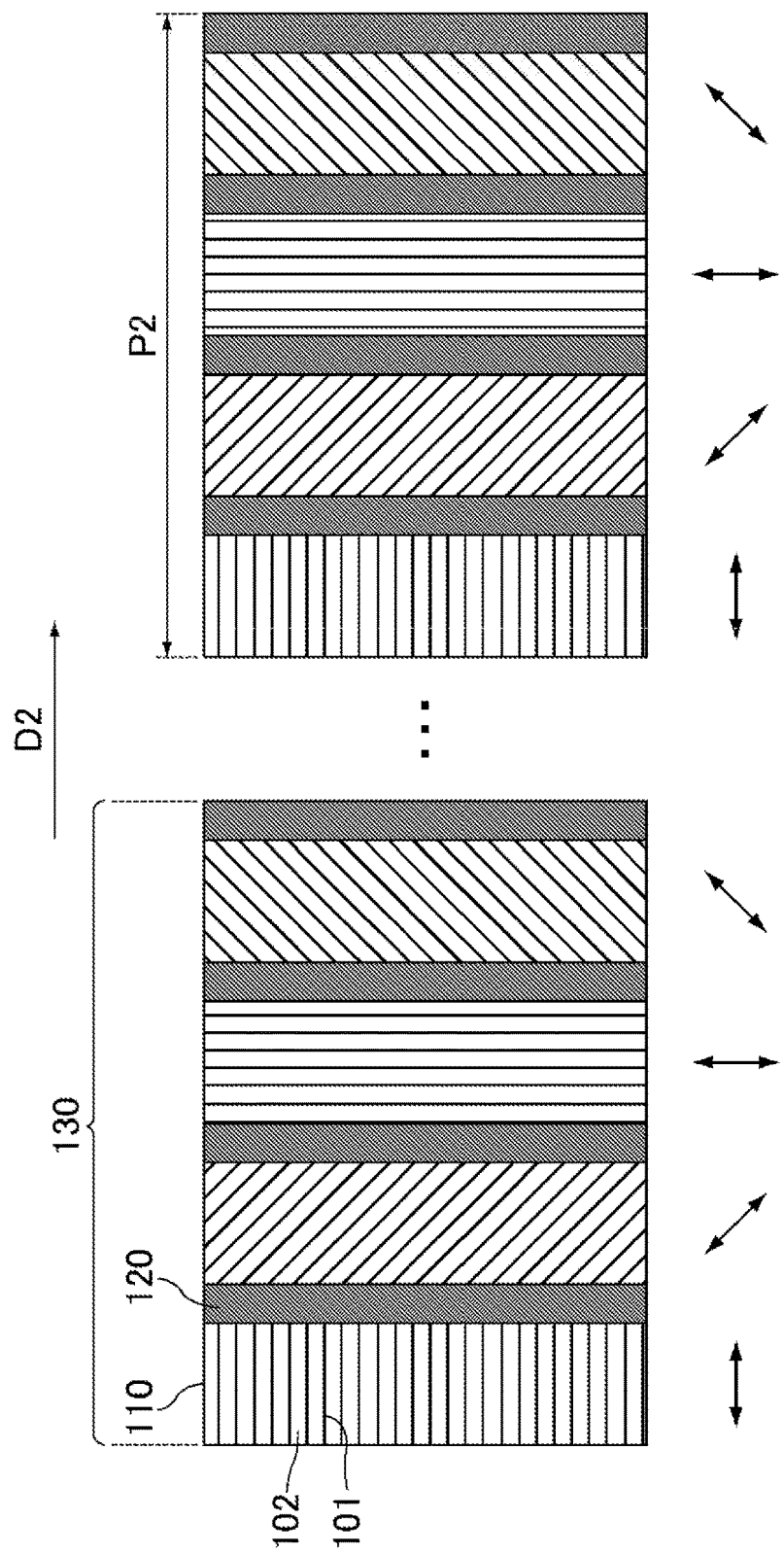
FIG. 17 is a schematic plan view of a wire grid polarizer of Examples 1A to 1D.

FIG. 17 is a schematic plan view of a wire grid polarizer of Examples 1A to 1D. The double-headed arrows in FIG. 17 each show the polarization axis direction of linearly polarized light passed through the wire grid polarizer. The wire grid polarizer used was one in which, as shown in FIG. 17, the orientation of the wires 101 in each WG region 110 rotates by 45° in the neighboring WG region 110 when the WG regions 110 are observed in the direction D2. Four patterns (A to D) shown in the following Table 1 were used in which the widths of the WG regions 110 in the direction D2 were different from the widths of the light-shielding regions 120 in the direction D2.

Lastly, the liquid crystal cell temperature was dropped to room temperature, whereby a liquid crystal diffraction grating (cell thickness=3.0 μm) with a pre-tilt angle of substantially 0° as shown in FIG. 3 was completed. The examples with wire grid polarizers in the patterns A to D are Examples 1A to 1D, respectively.

TABLE 1

| Pattern | Width of WG region 0° | Width of light-shielding region | Width of WG region 45° | Width of light-shielding region | Width of WG region 90° | width of light-shielding region | Width of WG region 135° | Width of light-shielding region | Pitch |
|---|---|---|---|---|---|---|---|---|---|
| A | 1.8 μm | 0.2 μm | 1.8 μm | 0.2 μm | 1.8 μm | 0.2 μm | 1.8 μm | 0.2 μm | 8 μm |
| B | 3.6 μm | 0.4 μm | 3.6 μm | 0.4 μm | 3.6 μm | 0.4 μm | 3.6 μm | 0.4 μm | 16 μm |
| C | 5.4 μm | 0.6 μm | 5.4 μm | 0.6 μm | 5.4 μm | 0.6 μm | 5.4 μm | 0.6 μm | 24 μm |
| D | 7.2 μm | 0.8 μm | 7.2 μm | 0.8 μm | 7.2 μm | 0.8 μm | 7.2 μm | 0.8 μm | 32 μm |

Comparative Example 1

In Comparative Example 1, a polymer dispersed liquid crystal (PDLC) cell was produced. The production included the same processes as in the examples, except that a PDLC liquid crystal material (PNM-170) available from DIC Corporation was used as a liquid crystal material, and unpolarized light was applied without a wire grid polarizer.

Test

The following tests were performed on the produced liquid crystal diffraction gratings and PDLC cell.

Haze Measurement

The haze (visible region) was measured when the voltage applied to the paired electrodes was 0 V and 10 V. The measurement was performed using a haze meter SH7000 (Nippon Denshoku Industries Co., Ltd.) within the range of 380 to 780 nm. The measurement temperature was set to 25° C.

Response Speed

The response speed in switching between application of a voltage of 0 V and application of a voltage of 10 V to the paired electrodes was tested at 10° C., 25° C., and 40° C. The test was performed using a Photal 5200 (Otsuka Electronics Co., Ltd.) by measuring the time taken for the transmittance to change from 10% to 90% or from 90% to 10%. The change from 10% to 90% is defined as the response time τr, while the change from 90% to 10% is defined as the response time τd.

The results are shown in the following Table 2.

TABLE 2

| | Haze (%) | | 10° C. | | 25° C. | | 40° C. | |
|---|---|---|---|---|---|---|---|---|
| | 0 V | 10 V | τr (ms) | τd (ms) | τr (ms) | τd (ms) | τr (ms) | τd (ms) |
| Example 1A | 95 | 5.3 | 17.0 | 26.3 | 2.9 | 6.8 | 1.0 | 5.0 |
| Example 1B | 93 | 5.3 | 17.5 | 27.3 | 3.3 | 7.6 | 1.4 | 6.7 |
| Example 1C | 92 | 5.5 | 17.5 | 31.1 | 3.3 | 7.8 | 1.5 | 6.7 |
| Example 1D | 90 | 5.2 | 17.7 | 35.7 | 3.4 | 8.3 | 1.5 | 7.3 |
| Comparative Example 1 | 92 | 5.4 | 20.1 | 46.6 | 3.3 | 9.5 | 1.6 | 11.9 |

The results in Table 2 show that the haze values in Examples 1A to 1C utilizing the wire grid polarizers in the patterns A to C were equivalent to the value in Comparative Example 1 both at applied voltages of 0 V and 10 V. The haze values in Examples 1A to 1D utilizing the wire gird polarizers in the respective patterns A to D at an applied voltage of 0 V (hereinafter, also referred to as an off-state haze value) were 90% or higher, which confirmed that the switching was achieved at a level sufficient for an optical element. The off-state haze values were slightly different due to different wire grid polarizers. Increasing the width of each light-shielding region slightly decreased the off-state haze value. This is presumably because in a region corresponding to a light-shielding region, the liquid crystal alignment states were random and the scattering level slightly changed. Also, since the retardation of the liquid crystal cells tested was 470 nm, the liquid crystal diffraction gratings were found to be usable as near-infrared light switching elements.

Examples 1A to 1D showed a higher response speed than Comparative Example 1 at all the temperatures of 10° C. to 40° C. (both τr and τd). Here, increasing the width of each light-shielding region of the wire grid polarizer increased random liquid crystal alignment state regions, which slightly decreased the response speed. The response speed at 0° C. to 40° C. increased presumably because the liquid crystal layer included no polymer network in Examples 1A to 1D but a polymer network was formed around the liquid crystal molecules in Comparative Example 1, and the polymer network restrained movement of the liquid crystal molecules to some degree. In Comparative Example 1, the τd (decay response) at 40° C. was higher than at 25° C. presumably because the mobility of the polymer network at 40° C. was higher than at 25° C., which reduced the alignment-controlling force for the liquid crystal molecules. This phenomenon was not observed in Examples 1A to 1D in which no polymer network was formed.

With the wire grid polarizer in the pattern D, the liquid crystal diffraction grating exhibited weak diffraction and a lower off-state haze value than Comparative Example 1 (PNLC) employing the scattering technique. Thus, there is no superiority of the liquid crystal diffraction grating to PNLC at a pitch of 32 μm, but the liquid crystal diffraction

Example 2A

Liquid Crystal Composition Containing Monomer

The same liquid crystal composition as in Examples 1A to 1D was used.

Production of Liquid Crystal Diffraction Grating

Paired substrates each including an ITO electrode were prepared. A twisted nematic (TN)-mode polyimide-based alignment agent (available from JSR Corporation) was applied to each of the substrates by spin coating. The agent was pre-baked on a hot plate at 90° C. for one minute, and post-baked in an oven at 200° C. for 20 minutes, so that alignment films (rubbing alignment films) were formed. The surfaces of the alignment films were rubbed such that rubbing directions for the paired substrates were antiparallel. After the rubbing, the substrates were immersed in isopropyl alcohol for five minutes and then washed. A sealant was applied to one of the substrates, and the liquid crystal composition was dropped in a region surrounded by the sealant. The substrate was bonded to the other substrate, so that a liquid crystal cell was produced. The sealant was a heat-curable sealant, an ultraviolet-curable sealant, or a heat- and ultraviolet-curable sealant. Unpolarized ultraviolet rays were applied to the wire grid polarizer in the pattern A shown in Table. 1 with the liquid crystal cell temperature set equal to or higher than the $T_{NI}$ (95° C.), so that linearly polarized ultraviolet rays were applied to the liquid crystal cell from the normal direction through the wire grid polarizer with an intensity of 2 J/cm². Lastly, the liquid crystal cell temperature was dropped to room temperature, whereby a liquid crystal diffraction grating (cell thickness=3.0 μm) with a pre-tilt angle of substantially 8° as shown in FIG. 7 was completed.

Test

The tests described above were performed on the produced liquid crystal diffraction grating. The results are shown in the following Table 3.

TABLE 3

|  | Haze (%) | | 10° C. | | 25° C. | | 40° C. | |
|  | 0 V | 10 V | τr (ms) | τd (ms) | τr (ms) | τd (ms) | τr (ms) | τd (ms) |
| --- | --- | --- | --- | --- | --- | --- | --- | --- |
| Example 2A | 92 | 5.2 | 13.8 | 14.4 | 2.2 | 4.6 | 0.9 | 2.7 |

The results in Table 3 show that the off-state haze value was slightly lower than that in Example 1A, but was 90% or higher. The slight decrease is presumed to be due to provision of the pre-tilt angle.

The response speed was higher than that in Example 1A. This is also presumed to be due to provision of the pre-tilt angle.

Example 3A

Liquid Crystal Composition Containing Monomer

A 1.0 wt % monomer represented by the formula (1) and a 0.5 wt % monomer represented by the following formula (2) were dissolved in a liquid crystal material having positive anisotropy of dielectric constant ($T_{NI}$=75° C., Δn=0.155, Δε=10). The mixture was left to stand at 25° C. for 24 hours to dissolve the monomers in the liquid crystal material completely. Thereby, a liquid crystal composition was prepared. In the present example, the monomer represented by the following formula (2) and containing a biphenyl group and an alkyl group is used together, so that these groups are introduced to the polymer side chains to provide a pre-tilt angle.

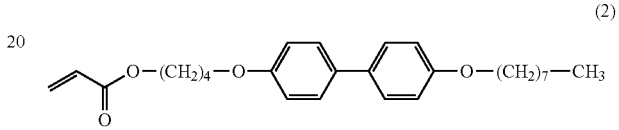

(2)

Production of Liquid Crystal Diffraction Grating

Paired substrates each including an ITO electrode were prepared. A sealant was applied to one of the substrates, and a liquid crystal composition obtained above was dropped in a region surrounded by the sealant. The substrate was bonded to the other substrate, so that a liquid crystal cell was produced. The sealant was a heat-curable sealant, an ultraviolet-curable sealant, or a heat- and ultraviolet-curable sealant. Unpolarized ultraviolet rays were applied to the wire grid polarizer in the pattern A with the liquid crystal cell temperature set equal to or higher than the $T_{NI}$ (95° C.), so that linearly polarized ultraviolet rays were applied to the liquid crystal cell from the normal direction through the wire grid polarizer with an intensity of 2 J/cm². Lastly, the liquid crystal cell temperature was dropped to room temperature, whereby a liquid crystal diffraction grating (cell thickness=3.0 μm) including no common polyimide-based alignment film but providing a pre-tilt angle as shown in FIG. 4 was completed.

Test

The tests described above were performed on the produced liquid crystal diffraction grating. The results are shown in the following Table 4.

TABLE 4

|  | Haze (%) | | 10° C. | | 25° C. | | 40° C. | |
|  | 0 V | 10 V | τr (ms) | τd (ms) | τr (ms) | τd (ms) | τr (ms) | τd (ms) |
| --- | --- | --- | --- | --- | --- | --- | --- | --- |
| Example 3A | 93 | 5.2 | 14.5 | 22.9 | 2.8 | 5.8 | 0.9 | 3.4 |

The results in Table 4 show that the off-state haze value was slightly lower than that in Example 1A, but was 90% or higher. The off-state haze value was equivalent to that in Example 2A. The slight decrease is presumed to be due to provision of the pre-tilt angle.

The response speed was higher than that in Example 1A. This is also presumed to be due to provision of the pre-tilt angle. The response speed was slightly lower than that in Example 2A, but this may be due to a slightly smaller pre-tilt angle than that in Example 2A.

Example 4A

Liquid Crystal Composition Containing Monomer

A 1.0 wt % monomer represented by the following formula (3) and a 0.5 wt % additive (adsorbent adsorptive to ITO electrodes) represented by the following formula (4) were dissolved in a liquid crystal material having positive anisotropy of dielectric constant ($T_{NI}$=75° C., $\Delta n$=0.155, $\Delta \varepsilon$=10). The mixture was left to stand at 25° C. for 24 hours to dissolve the monomer and the additive in the liquid crystal material completely. Thereby, a liquid crystal composition was prepared. A hydroxy group in the hydroxy group-containing compound represented by the following formula (4) and containing a biphenyl group and an alkyl group adsorbs to the ITO surface via a hydrogen bond to provide a pre-tilt angle to the liquid crystal molecules.

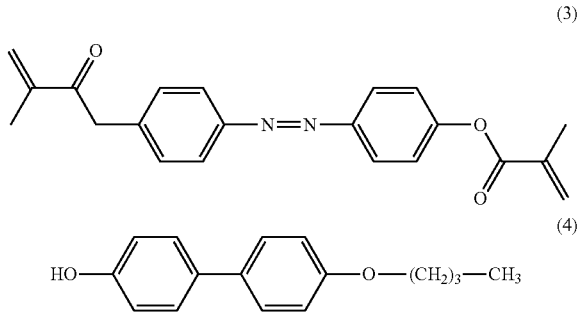

(3)

(4)

Production of Liquid Crystal Diffraction Grating

Paired substrates each including an ITO electrode were prepared. A sealant was applied to one of the substrates, and a liquid crystal composition obtained above was dropped in a region surrounded by the sealant. The substrate was bonded to the other substrate, so that a liquid crystal cell was produced. The sealant was a heat-curable sealant, an ultraviolet-curable sealant, or a heat- and ultraviolet-curable sealant. Unpolarized ultraviolet rays were applied to the wire grid polarizer in the pattern A in Table 1 with the liquid crystal cell temperature set equal to or higher than the $T_{NI}$ (95° C.), so that linearly polarized ultraviolet rays were applied to the liquid crystal cell from the normal direction through the wire grid polarizer with an intensity of 2 J/cm². Lastly, the liquid crystal cell temperature was dropped to room temperature, whereby a liquid crystal diffraction grating (cell thickness=3.0 μm) including no common polyimide-based alignment film as shown in FIG. 4 but providing a pre-tilt angle was completed.

Test

The tests described above were performed on the produced liquid crystal diffraction grating. The results are shown in the following Table 5.

TABLE 5

| | Haze (%) | | 10° C. | | 25° C. | | 40° C. | |
|---|---|---|---|---|---|---|---|---|
| | 0 V | 10 V | τr (ms) | τd (ms) | τr (ms) | τd (ms) | τr (ms) | τd (ms) |
| Example 4A | 93 | 5.3 | 14.3 | 19.7 | 2.3 | 5.0 | 0.9 | 2.8 |

The results in Table 5 show that the off-state haze value was slightly lower than that in Example 1A, but was 90% or higher. The off-state haze value was equivalent to those in Examples 2A and 3A. The slight decrease is presumed to be due to provision of the pre-tilt angle.

The response speed was higher than that in Example 1A. This is also presumed to be due to provision of the pre-tilt angle.

These results confirmed that a pre-tilt angle can be provided and a high response speed can be achieved also by introducing an additive adsorptive to the ITO surface and providing a pre-tilt angle.

Examples 5A to 5D

Liquid crystal diffraction gratings of Examples 5A to 5D were produced as in Examples 1A to 1D, except that the liquid crystal materials having positive anisotropy of dielectric constant used were materials with the respective following four different Δn values (1) to (4), and a wire grid polarizer in the pattern A was used. The examples utilizing the liquid crystal materials with the following Δn values (1) to (4) are Examples 5A to 5D, respectively.
(1) 0.093
(2) 0.120
(3) 0.155 (same as in Examples 1A to 1D)
(4) 0.18

The monomer used was the monomer represented by the formula (1). The $T_{NI}$ and $\Delta \varepsilon$ of the liquid crystal material were the same as those in Examples 1A to 1D.

Test

The tests described above were performed on the produced liquid crystal diffraction grating. The results are shown in the following Table 6.

TABLE 6

| | Retardation (nm) | Haze (%) | | 10° C. | | 25° C. | | 40° C. | |
|---|---|---|---|---|---|---|---|---|---|
| | | 0 V | 10 V | τr (ms) | τd (ms) | τr (ms) | τd (ms) | τr (ms) | τd (ms) |
| Example 5A | 279 | 95 | 5.2 | 16.2 | 23.3 | 2.7 | 6.4 | 1.0 | 4.7 |
| Example 5B | 360 | 95 | 5.2 | 16.4 | 25.0 | 2.7 | 6.5 | 1.0 | 4.9 |
| Example 5C (same as Example 1A) | 465 | 95 | 5.3 | 17.0 | 26.3 | 2.9 | 6.8 | 1.0 | 5 |
| Example 5D | 540 | 90 | 5.3 | 17.5 | 27.3 | 2.9 | 7.1 | 1.0 | 5.1 |

The results in Table 6 show that even when the retardations of the liquid crystal layers were different due to different Δn values of the liquid crystal materials, the haze values and the response speeds were at substantially the same levels.

Example 6

To eliminate viewing angle dependence in the diffraction state of the wire grid polarizers in the pattern B in Examples 1A to 1D, the following improvements were further made.

Figure 18:
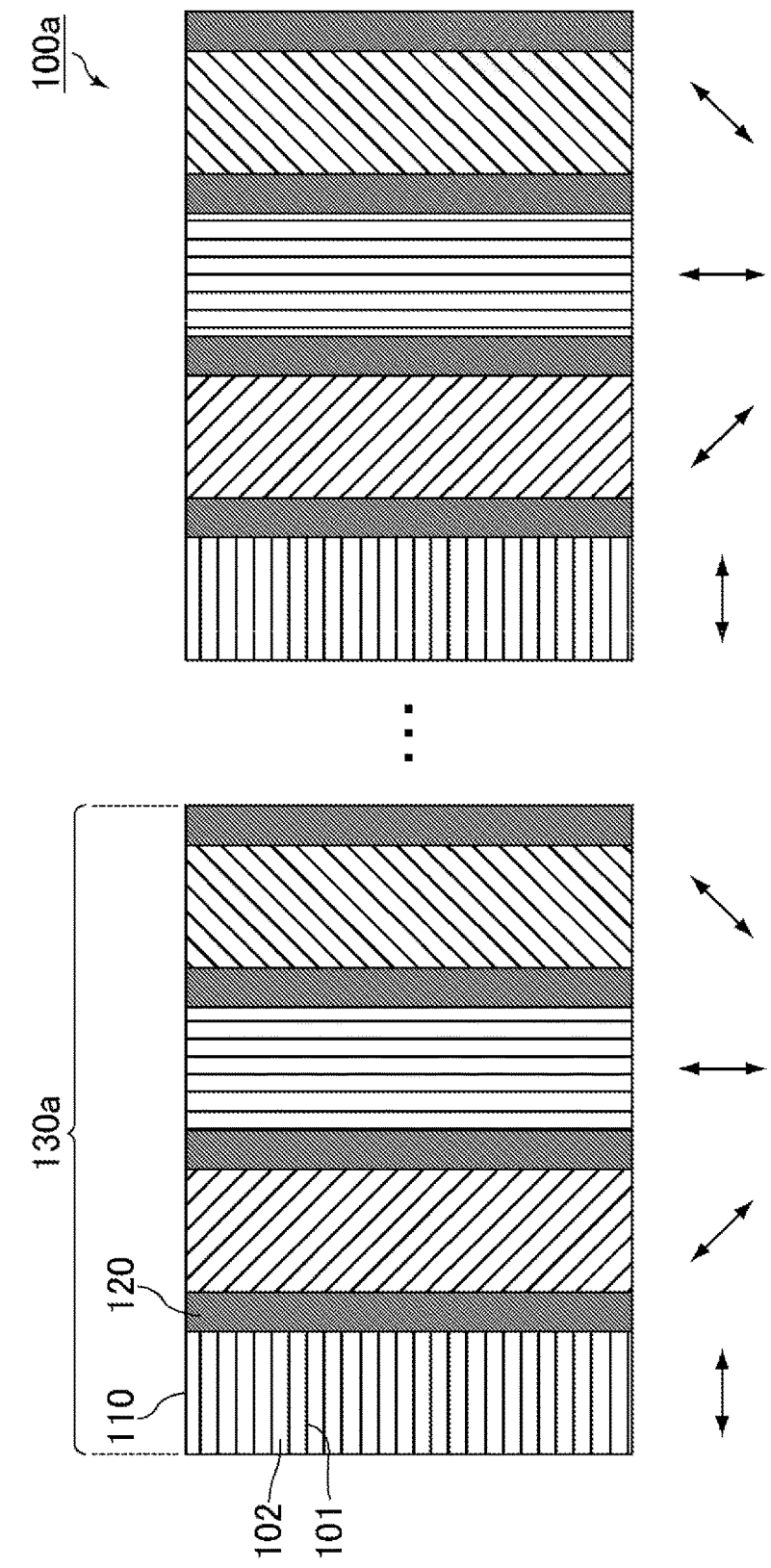
FIG. 18 is a schematic plan view of a wire grid polarizer of Example 6 in a first pattern.
Figure 19:
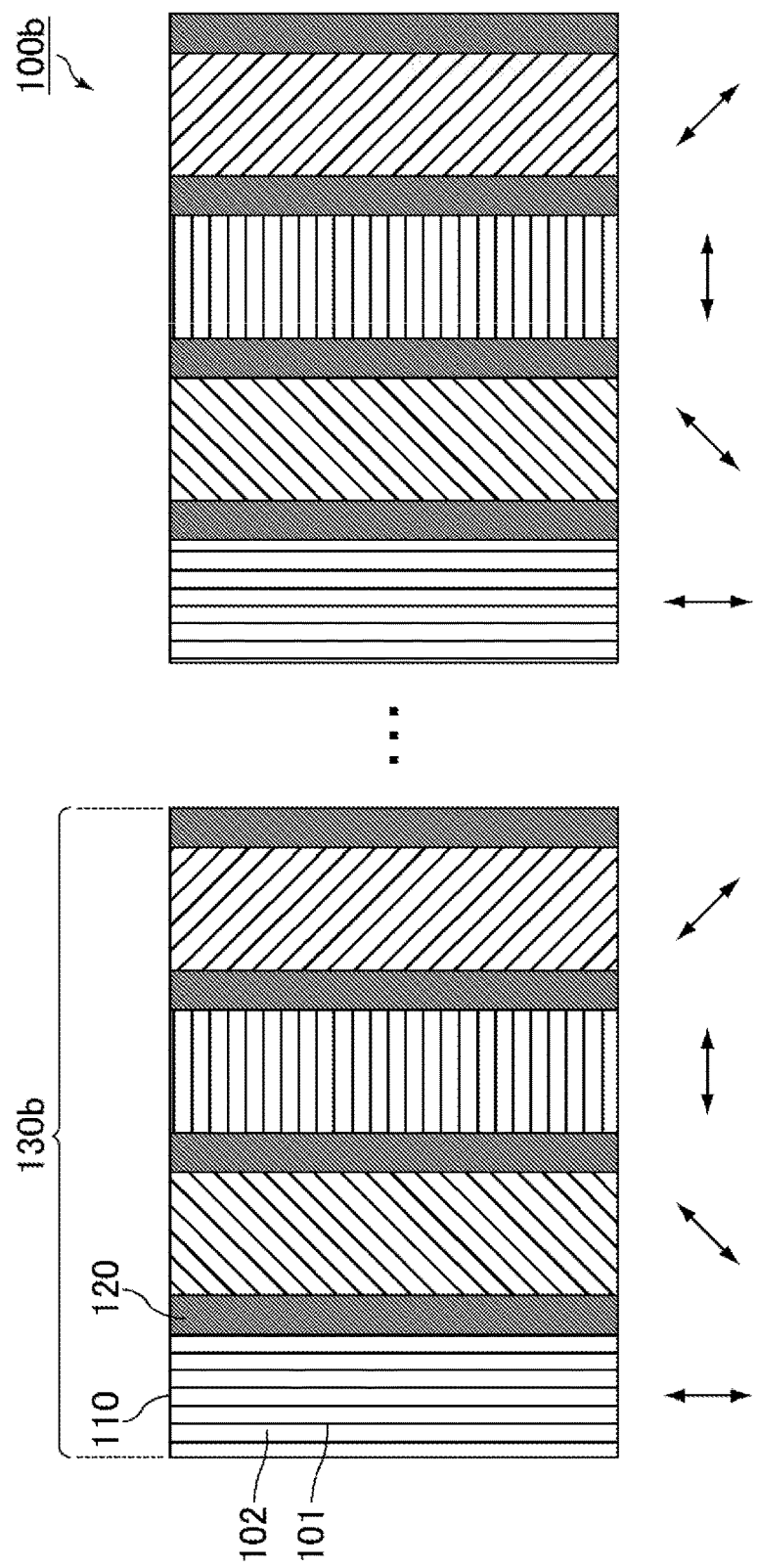
FIG. 19 is a schematic plan view of the wire grid polarizer of Example 6 in a second pattern.
Figure 20:
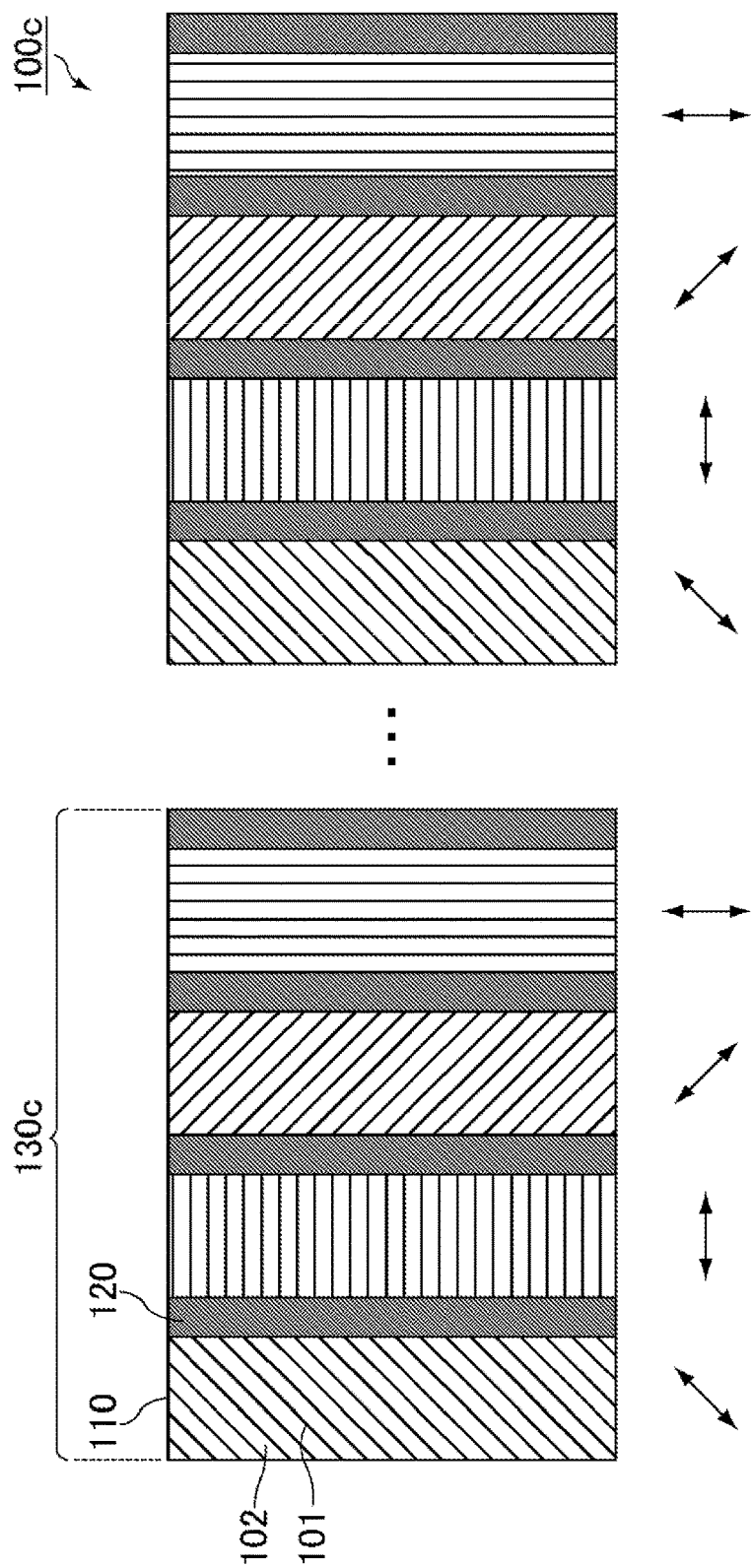
FIG. 20 is a schematic plan view of the wire grid polarizer of Example 6 in a third pattern.
Figure 21:
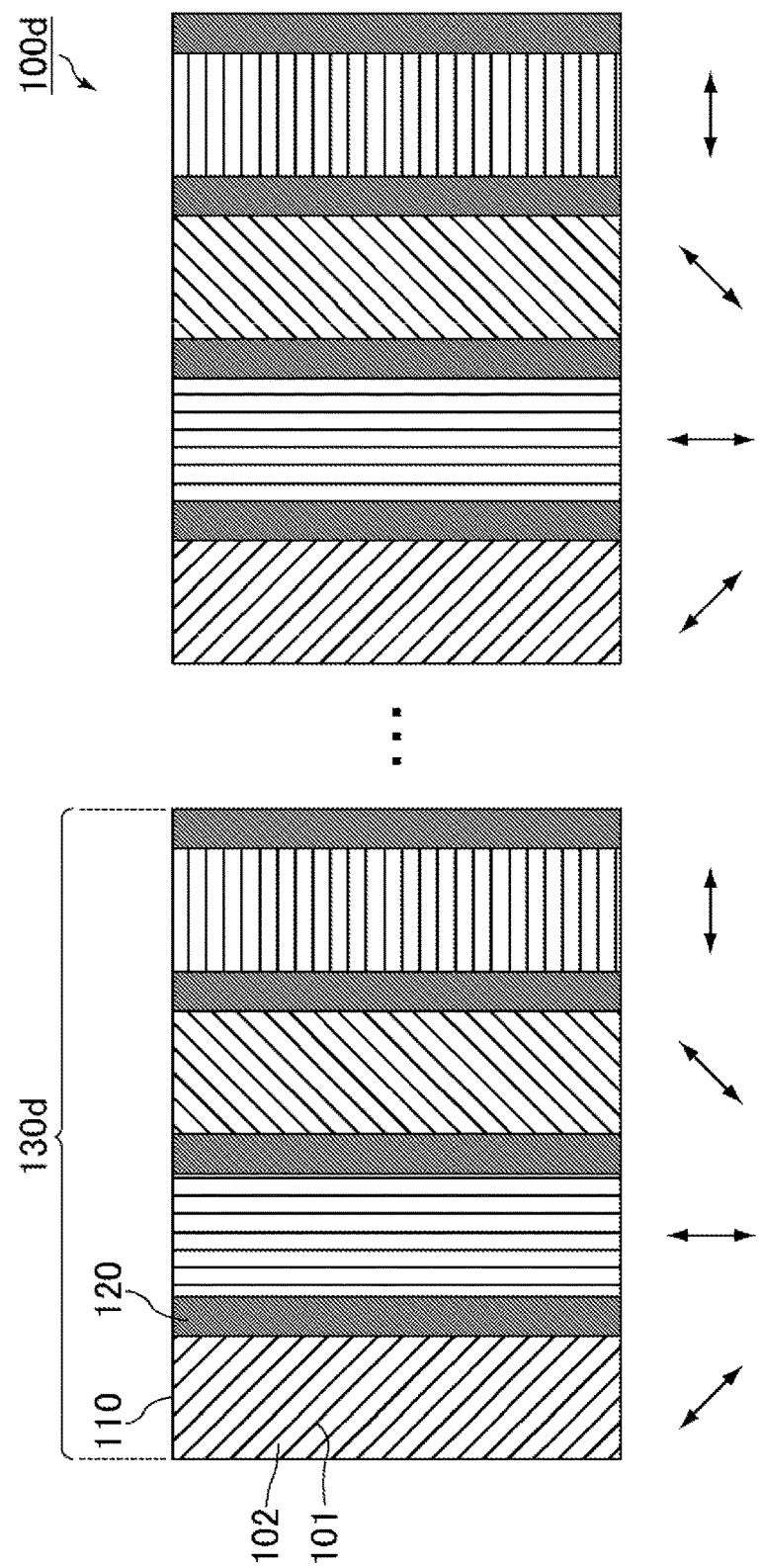
FIG. 21 is a schematic plan view of the wire grid polarizer of Example 6 in a fourth pattern.

FIG. 18 is a schematic plan view of a wire grid polarizer of Example 6 in a first pattern. FIG. 19 is a schematic plan view of the wire grid polarizer of Example 6 in a second pattern. FIG. 20 is a schematic plan view of the wire grid polarizer of Example 6 in a third pattern. FIG. 21 is a schematic plan view of the wire grid polarizer of Example 6 in a fourth pattern. The double-headed arrows in FIGS. 18 to 21 each show the polarization axis direction of linearly polarized light passed through the wire grid polarizer. The wire grid polarizer of the present example includes regions in first, second, third, and fourth patterns 100a, 100b, 100c, and 100d as shown in FIGS. 18 to 21.

The first pattern 100a repeatedly includes a basic structure 130a in which a WG region 110 with the wires 101 extending in the horizontal direction is situated at one end, and a WG region 110 with the wires 101 extending in the +45° direction is situated at the other end. This first pattern 100a is shown as a vertical stripe pattern in FIGS. 22 and 24 described later.

The second pattern 100b is obtained by rotating by 90° the orientation of the wires 101 in each WG region 110 in the first pattern 100a. The second pattern 100b repeatedly includes a basic structure 130b in which a WG region 110 with the wires 101 extending in the vertical direction is situated at one end, and a WG region 110 with the wires 101 extending in the −45° direction is situated at the other end. This second pattern 100b is shown as a horizontal stripe pattern in FIG. 22 described later.

The third pattern 100c is obtained by rotating by +45° the orientation of the wires 101 in each WG region 110 in the first pattern 100a. The third pattern 100c repeatedly includes a basic structure 130c in which a WG region 110 with the wires 101 extending in the +45° direction is situated at one end, and a WG region 110 with the wires 101 extending in the vertical direction is situated at the other end. This third pattern 100c is shown as a right-up diagonal stripe pattern in FIG. 22 described later.

The fourth pattern 100d is obtained by rotating by −45° the orientation of the wires 101 in each WG region 110 in the first pattern 100a. The fourth pattern 100d repeatedly includes a basic structure 130d in which a WG region 110 with the wires 101 extending in the −45° direction is situated at one end, and a WG region 110 with the wires 101 extending in the horizontal direction is situated at the other end. This fourth pattern 100d is shown as a left-up diagonal stripe pattern in FIG. 22 described later.

Figure 22:
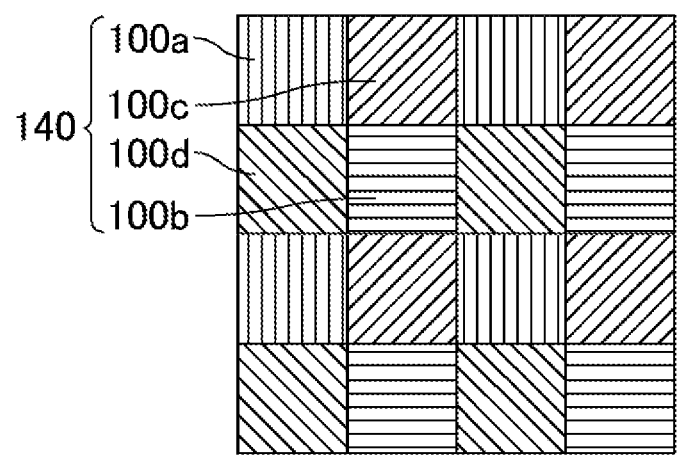
FIG. 22 is a schematic plan view of the wire grid polarizer of Example 6.

FIG. 22 is a schematic plan view of the wire grid polarizer of Example 6. As shown in FIG. 22, the wire grid polarizer of the present example includes the first, second, third, and fourth patterns 100a, 100b, 100c, and 100d (each pattern having a 80-μm-square shape) in two rows×two columns. Blocks 140 each composed of these four first, second, third, and fourth patterns 100a, 100b, 100c, and 100d are arranged in 50 rows×50 columns.

A liquid crystal diffraction grating of Example 6 was produced as in Examples 1A to 1D, except that the wire grid polarizer shown in FIG. 22 was used. The liquid crystal active area had a size of 8 mm square.

Figure 23:
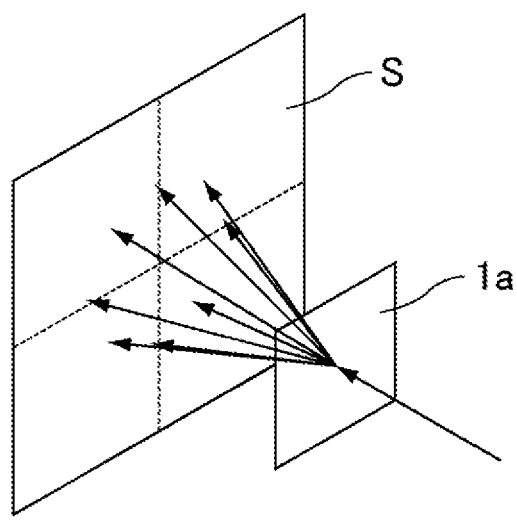
FIG. 23 is a schematic perspective view illustrating a diffraction state achieved by a liquid crystal diffraction grating of Example 6.

FIG. 23 is a schematic perspective view illustrating a diffraction state achieved by a liquid crystal diffraction grating of Example 6. As shown in FIG. 23, when laser light was incident on the liquid crystal diffraction grating 1a of the present example, the light was diffracted on the screen S in the up, down, right, left, and oblique directions, so that a wide viewing angle was achieved.

Example 7

Figure 24:
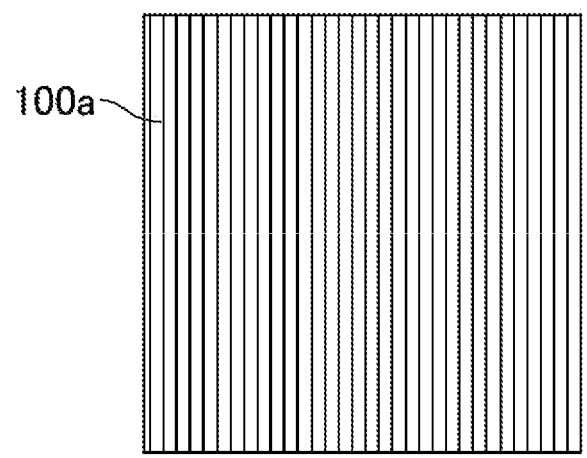
FIG. 24 is a schematic plan view of a wire grid polarizer of Example 7.

FIG. 24 is a schematic plan view of a wire grid polarizer of Example 7. As shown in FIG. 24, a wire grid polarizer of the present example is only in the first pattern 100a.

A liquid crystal diffraction grating of Example 7 was produced as in Examples 1A to 1D, except that the wire grid polarizer shown in FIG. 24 was used. The liquid crystal active area had a size of 8 mm square.

Figure 25:
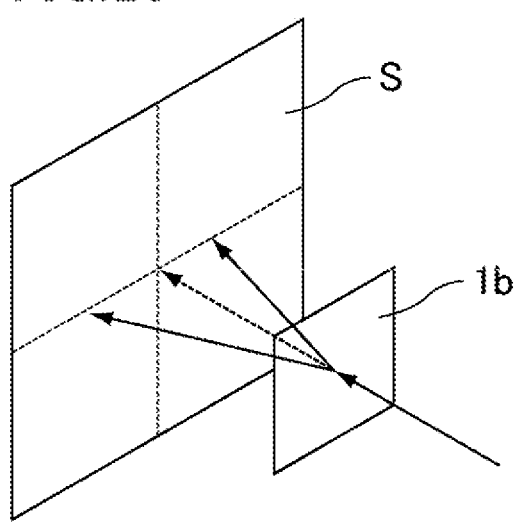
FIG. 25 is a schematic perspective view illustrating a diffraction state achieved by a liquid crystal diffraction grating of Example 7.

FIG. 25 is a schematic perspective view illustrating a diffraction state achieved by a liquid crystal diffraction grating of Example 7. As shown in FIG. 25, when laser light was incident on the liquid crystal diffraction grating 1b of the present example, the light was diffracted on the screen S only in the right and left directions, not in the up and down directions.

Additional Remarks

One aspect of the present invention may be a liquid crystal diffraction grating including: paired substrates each including an electrode; a liquid crystal layer being held between the substrates and containing a liquid crystal material; a sealant disposed to surround the liquid crystal layer in a plan view; and an alignment-controlling layer being disposed in a region surrounded by the sealant in a plan view and being in contact with the liquid crystal layer between the liquid crystal layer and each of or one of the substrates, the alignment-controlling layer being configured to align liquid crystal molecules in the liquid crystal material in a direction parallel to the substrates and containing a polymer of at least one monomer, the orientation of the liquid crystal molecules periodically rotating in at least one direction in a plan view of the liquid crystal layer in a horizontal alignment state where the liquid crystal molecules are aligned in the direction parallel to the substrates, the liquid crystal diffraction grating being switchable between a diffraction state and a transparent state upon application of voltage to the electrodes of the substrates.

The alignment of the liquid crystal molecules in the liquid crystal material is controlled by the alignment-controlling layer being in contact with the liquid crystal layer between the liquid crystal layer and each of or one of the substrates. This eliminates the need for a polymer matrix in the liquid crystal layer, giving an excellent response speed in switching between the diffraction state and the transparent state to the liquid crystal diffraction grating.

The alignment-controlling layer is disposed in a region surrounded by the sealant in a plan view, and contains a polymer of at least one monomer. Thereby, the liquid crystal diffraction grating can be produced by a simple process of irradiating a liquid crystal material (liquid crystal composition) containing at least one monomer with ultraviolet rays through a wire grid polarizer.

In a plan view of the liquid crystal layer in the horizontal alignment state, the orientation of the liquid crystal molecules may half rotate in the at least one direction at a pitch of 5 µm or more and 50 µm or less. If the pitch is less than 5 µm, the wire grid polarizer may not be produced. If the pitch is more than 50 µm, light may be insufficiently diffracted, decreasing the haze.

In a plan view in the horizontal alignment state, the liquid crystal layer may include domains arranged in the at least one direction, the liquid crystal molecules may be oriented to the same direction in each of the domains, and the orientation of the liquid crystal molecules in each of the domains may rotate by a predetermined angle in the neighboring domain in the arrangement direction of the domains. Thereby, the alignment-controlling layer can be easily formed using a wire grid polarizer, and thus the periodically rotating orientation of the liquid crystal molecules can be easily achieved.

A retardation of the liquid crystal layer may be 270 nm or more and 550 nm or less. Thereby, the liquid crystal diffraction grating can be used both as a display and as a switch for a (near) infrared sensor.

In the horizontal alignment state, the liquid crystal molecules may have a tilt angle of 0° or greater and 10° or smaller. Thereby, the diffraction state can be more effectively achieved and the liquid crystal molecules can be made to response more effectively upon voltage application owing to the tilt angle. This enables more effective switching between the diffraction state and the transparent state.

The at least one monomer may contain at least one polarized light-absorbing functional group. Thereby, the alignment-controlling layers can be easily formed using a wire grid polarizer.

The polymer may contain at least one polarized light-absorbing functional group. Thereby, the alignment-controlling layers can be easily formed using a wire grid polarizer.

The at least one polarized light-absorbing functional group may contain at least one selected from a chalcone group and an azobenzene group. Thereby, the at least one monomer absorbing polarized light can undergo isomerization or dimerization, arranging (aligning) the liquid crystal molecules in one specific direction relative to the polarization direction. For liquid crystal solubility, a chalcone group is more preferred than an azobenzene group.

The polymer may contain a biphenyl group and an alkyl group. Thereby, in the horizontal alignment state, the tilt angle of the liquid crystal molecules can be made greater than 0°, so that the response speed of the liquid crystal diffraction grating can be further increased.

The alignment-controlling layer may contain an additive that is adsorptive to at least one of the electrodes. Thereby, in the horizontal alignment state, the tilt angle of the liquid crystal molecules can be made greater than 0°, so that the response speed of the liquid crystal diffraction grating can be further increased.

The additive may contain a hydroxy group, a biphenyl group, and an alkyl group. The hydroxy group makes the additive selectively adsorptive to the electrodes made of ITO. The biphenyl group and the alkyl group contribute to a stable tilt angle.

The liquid crystal diffraction grating may further include an alignment film between the alignment-controlling layer and each of or one of the substrates. Thereby, in the horizontal alignment state, the tilt angle of the liquid crystal molecules can be made greater than 0°, so that the response speed of the liquid crystal diffraction grating can be further increased.

The alignment film may contain at least one selected from a polyamic acid and a polyimide. Thereby, the stability of the alignment films against heat can be enhanced.

Another aspect of the present invention may be a liquid crystal composition containing: a liquid crystal material; at least one selected from a monomer containing a chalcone group and a monomer containing an azobenzene group; and a monomer containing a biphenyl group and an alkyl group. Thereby, a liquid crystal layer of the liquid crystal diffraction grating can be formed in which in the horizontal alignment state, the tilt angle of the liquid crystal molecules is greater than 0°.

The monomer containing a biphenyl group and an alkyl group may be represented by the following formula (2). Thereby, a uniform, stable pre-tilt angle can be provided. In other words, such a monomer can reduce the pre-tilt angle variation at different positions and can reduce the change in the pre-tilt angle with time. The monomer represented by the following formula (2) is also preferred in terms of high liquid crystal solubility.

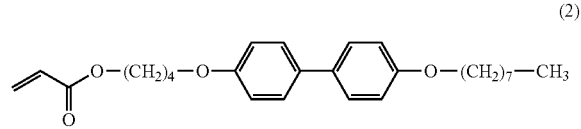

(2)

Yet another aspect of the present invention may be a liquid crystal composition containing: a liquid crystal material; at least one selected from a monomer containing a chalcone group and a monomer containing an azobenzene group; and an additive containing a hydroxy group, a biphenyl group, and an alkyl group. Thereby, a liquid crystal layer of the liquid crystal diffraction grating can be formed in which in the horizontal alignment state, the tilt angle of the liquid crystal molecules is greater than 0°.

The additive may be represented by the following formula (4). The hydroxy group makes the additive selectively adsorptive to electrodes made of ITO in the liquid crystal diffraction grating. The biphenyl group and the alkyl group contribute to a stable tilt angle. The additive represented by the following formula (4) is also preferred in terms of high liquid crystal solubility and easy phase separation from the liquid crystal.

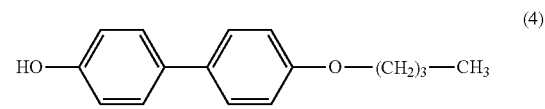

(4)

Yet another aspect of the present invention may be a method for producing a liquid crystal diffraction grating switchable between a diffraction state and a transparent state upon application of voltage to paired electrodes disposed on paired substrates between which a liquid crystal layer is held, the method including: forming a liquid crystal layer by sealing a liquid crystal composition containing a liquid crystal material and at least one monomer between the substrates which are bonded by a sealant; and forming an alignment-controlling layer between the liquid crystal layer and each of or one of the substrates by irradiating the liquid crystal layer with ultraviolet rays and thereby polymerizing the at last one monomer, the alignment-controlling layer being configured to align liquid crystal molecules in the liquid crystal material in a direction parallel to the substrates, the orientation of the liquid crystal molecules periodically rotating in at least one direction in a plan view of the liquid crystal layer in a horizontal alignment state where the liquid crystal molecules are aligned in the direction parallel to the substrates.

The production method allows production of a liquid crystal diffraction grating having an excellent response speed by a simple process.

The forming an alignment-controlling layer may include irradiating the liquid crystal layer with ultraviolet rays through a wire grid polarizer. Thereby, the periodically rotating orientation of the liquid crystal molecules can be easily achieved.

The forming an alignment-controlling layer may include irradiating the liquid crystal layer with ultraviolet rays while heating the liquid crystal layer at a temperature equal to or higher than the nematic-isotropic transition temperature of the liquid crystal material. This reduces the influence of light scattering of the liquid crystal layer, aligning liquid crystal molecules to rotate periodically with a higher degree of precision.

The production method may further include forming an alignment film on at least one of the substrates and subjecting the alignment film to alignment treatment. The alignment film may contain at least one polymer selected from a polyamic acid and a polyimide. Thereby, in the horizontal alignment state, the tilt angle of the liquid crystal molecules can be made greater than 0°, so that the response speed of the liquid crystal diffraction grating 1 can be further increased.

The forming an alignment film may include forming an alignment film on each of the substrates and subjecting the alignment films to alignment treatment such that the alignment treatment directions of the substrates, when disposed to each other, are opposite from and parallel to each other.

The alignment treatment may be rubbing or photo-alignment treatment.

Yet another aspect of the present invention may be a wire grid polarizer including linear wires, the orientation of the wires periodically rotating in at least one direction.

The wire grid polarizer allows production of a liquid crystal diffraction grating having an excellent response speed by a simple process.

The orientation of the wires may half rotate in the at least one direction at a pitch of 5 μm or more and 50 μm or less. If the pitch is less than 5 μm, the wire grid polarizer may not be produced. If the pitch is more than 50 μm, light may be insufficiently diffracted, decreasing the haze.

The polarizer may include regions arranged in at least one direction, the wires may be oriented to the same direction in each of the regions, and the orientation of the wires in each of the regions may rotate by a predetermined angle in the neighboring region in the arrangement direction of the regions. Thereby, the wire grid polarizer can be easily produced.

The aspects of the present invention described above may appropriately be combined within the spirit of the present invention.

What is claimed is:

1. A liquid crystal diffraction grating comprising:
   paired substrates each including an electrode;
   a liquid crystal layer being held between the paired substrates and containing a liquid crystal material;
   a sealant disposed to surround the liquid crystal layer in a plan view; and
   an alignment-controlling layer being disposed in a region surrounded by the sealant in a plan view and being in contact with the liquid crystal layer between the liquid crystal layer and at least one of the paired substrates,
   the alignment-controlling layer being configured to align liquid crystal molecules in the liquid crystal material in a direction parallel to the paired substrates and containing a polymer of at least one monomer,
   the alignment-controlling layer having been formed by irradiating the liquid crystal layer with ultraviolet rays through a wire grid polarizer and thereby polymerizing the at least one monomer present in the liquid crystal layer,
   an orientation direction of the liquid crystal molecules periodically rotating in at least one direction in a plan view of the liquid crystal layer in a horizontal alignment state where the liquid crystal molecules are aligned in the direction parallel to the paired substrates, and a period of rotation of the orientation direction of the liquid crystal molecules by 180 degrees is 5 μm or more and 50 μm or less,
   the liquid crystal diffraction grating being switchable between a diffraction state and a transparent state upon application of voltage to the electrodes of the paired substrates.

2. The liquid crystal diffraction grating according to claim 1,
   wherein in the plan view in the horizontal alignment state, the liquid crystal layer includes domains arranged in the at least one direction,
   the liquid crystal molecules are oriented to the same direction in each of the domains, and
   the orientation direction of the liquid crystal molecules in each of the domains rotates by a predetermined angle in the neighboring domain in the arrangement direction of the domains.

3. The liquid crystal diffraction grating according to claim 1,
   wherein a retardation of the liquid crystal layer is 270 nm or more and 550 nm or less.

4. The liquid crystal diffraction grating according to claim 1,
   wherein the at least one monomer contains at least one polarized light-absorbing functional group.

5. The liquid crystal diffraction grating according to claim 1,
   wherein the polymer contains at least one polarized light-absorbing functional group.

6. The liquid crystal diffraction grating according to claim 4,
   wherein the at least one polarized light-absorbing functional group contains at least one selected from a chalcone group and an azobenzene group.

7. The liquid crystal diffraction grating according to claim 1,
   wherein the alignment-controlling layer contains an additive that is adsorptive to at least one of the electrodes.

8. The liquid crystal diffraction grating according to claim 1, further comprising an alignment film between the alignment-controlling layer and the at least one of the paired substrates.

9. A method for producing a liquid crystal diffraction grating switchable between a diffraction state and a transparent state upon application of voltage to paired electrodes disposed on paired substrates between which a liquid crystal layer is held,
   the method comprising:
   forming a liquid crystal layer by sealing a liquid crystal composition containing a liquid crystal material and at least one monomer between the paired substrates which are bonded by a sealant; and forming an alignment-controlling layer between the liquid crystal layer and at least one of the paired substrates by irradiating the liquid crystal layer with ultraviolet rays through a wire grid polarizer and thereby polymerizing the at least one monomer, the alignment-controlling layer being configured to align liquid crystal molecules in the liquid crystal material in a direction parallel to the paired substrates, thus forming the liquid crystal diffraction grating switchable between a diffraction state and a transparent state upon application of voltage to the paired electrodes on the paired substrates, the orientation of the liquid crystal molecules periodically rotating in at least one direction in a plan view of the liquid crystal layer in a horizontal alignment state where the liquid crystal molecules are aligned in the direction parallel to the paired substrates, and a period of rotation of the orientation direction of the liquid crystal molecules by 180 degrees is 5 μm or more and 50 μm or less.

10. The method for producing a liquid crystal diffraction grating according to claim 9, wherein the forming an alignment-controlling layer includes irradiating the liquid crystal layer with ultraviolet rays while heating the liquid crystal layer at a temperature equal to or higher than the nematic-isotropic transition temperature of the liquid crystal material.

\* \* \* \* \*